(12) United States Patent
Luo et al.

(10) Patent No.: US 12,481,044 B2
(45) Date of Patent: Nov. 25, 2025

(54) SYSTEM AND METHOD FOR ULTRASOUND IMAGING

(71) Applicant: WUHAN UNITED IMAGING HEALTHCARE CO., LTD., Hubei (CN)

(72) Inventors: Rui Luo, Wuhan (CN); Cheng He, Wuhan (CN); Oliver Heid, Erlangen (DE)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 65 days.

(21) Appl. No.: 17/810,315

(22) Filed: Jun. 30, 2022

(65) Prior Publication Data

US 2022/0342060 A1 Oct. 27, 2022

Related U.S. Application Data

(63) Continuation of application No. PCT/CN2020/140621, filed on Dec. 29, 2020.

(30) Foreign Application Priority Data

Nov. 18, 2020 (CN) .......................... 202011293102.9
Nov. 20, 2020 (CN) .......................... 202011308586.X

(51) Int. Cl.
*G01S 7/52* (2006.01)
*A61B 8/00* (2006.01)
*G01S 15/89* (2006.01)

(52) U.S. Cl.
CPC ............ *G01S 7/52046* (2013.01); *A61B 8/00* (2013.01); *G01S 7/52034* (2013.01); *G01S 15/8993* (2013.01)

(58) Field of Classification Search
CPC ............ G01S 7/52046; G01S 7/52034; G01S 15/8993; A61B 8/00
See application file for complete search history.

(56) References Cited

U.S. PATENT DOCUMENTS 3,693,415 A 9/1972 Whittington
5,462,057 A * 10/1995 Hunt .................... G01S 7/52046
600/447
(Continued)

FOREIGN PATENT DOCUMENTS

CN 1788685 A 6/2006
CN 1847824 A 10/2006
(Continued)

OTHER PUBLICATIONS

International Search Report in PCT/CN2020/140621 mailed on Aug. 16, 2021, 5 pages.
(Continued)

*Primary Examiner* — Dixomara Vargas
(74) *Attorney, Agent, or Firm* — METIS IP LLC

(57) ABSTRACT

The present disclosure directs to a system and method for ultrasound imaging. The method may include obtaining a total count of detecting members of a detector of an ultrasound scanner and a directivity angle of each detecting member of the detector. The method may also include obtaining one or more focuses each of which corresponds to a transmission of ultrasound waves of the ultrasound scanner, wherein the one or more focuses are located within the detector. The method may further include determining a synthetic aperture for each of one or more transmissions corresponding to the one or more focuses based on the total count of the detecting members of the detector, the directivity angle of each detecting member of the detector, and
(Continued)

the one or more focuses, the synthetic aperture including at least one detecting member of the detector.

20 Claims, 27 Drawing Sheets

(56) References Cited

U.S. PATENT DOCUMENTS

| | | | |
|---|---|---|---|
| 5,549,002 | A | 8/1996 | Howard et al. |
| 5,676,149 | A | 10/1997 | Yao |
| 6,038,925 | A | 3/2000 | Ohtani et al. |
| 6,080,107 | A * | 6/2000 | Poland ............... A61B 8/481 |
| | | | 600/458 |
| 6,234,025 | B1 | 5/2001 | Gieske et al. |
| 6,629,929 | B1 | 10/2003 | Jago et al. |
| 7,255,678 | B2 | 8/2007 | Mehi et al. |
| 10,675,000 | B2 | 6/2020 | Specht et al. |
| 10,979,018 | B1 | 4/2021 | Siddiqui et al. |
| 2004/0015079 | A1 | 1/2004 | Berger et al. |
| 2005/0187494 | A1 | 8/2005 | He et al. |
| 2008/0125660 | A1 | 5/2008 | Yao et al. |
| 2008/0242992 | A1 | 10/2008 | Criton |
| 2009/0054780 | A1 | 2/2009 | Yang et al. |
| 2009/0062648 | A1 | 3/2009 | Derby, Jr. |
| 2009/0088638 | A1 | 4/2009 | Sato et al. |
| 2009/0088644 | A1 | 4/2009 | Yao et al. |
| 2010/0268082 | A1 | 10/2010 | Mclaughlin et al. |
| 2010/0321515 | A1 | 12/2010 | Imamura |
| 2011/0030479 | A1 | 2/2011 | Murai et al. |
| 2011/0102261 | A1 | 5/2011 | Egri et al. |
| 2011/0178441 | A1 * | 7/2011 | Tyler ............... A61B 5/4836 |
| | | | 601/2 |
| 2011/0319793 | A1 | 12/2011 | Hynynen |
| 2012/0071746 | A1 * | 3/2012 | Vortman ........... G01R 33/4804 |
| | | | 600/411 |
| 2012/0143059 | A1 | 6/2012 | Magee |
| 2012/0232803 | A1 * | 9/2012 | Viola ............... G01N 29/028 |
| | | | 422/50 |
| 2012/0283568 | A1 | 11/2012 | Loftman et al. |
| 2013/0046168 | A1 | 2/2013 | Sui |
| 2013/0194891 | A1 | 8/2013 | Kristoffersen et al. |
| 2014/0051984 | A1 | 2/2014 | Berger et al. |
| 2016/0278742 | A1 | 9/2016 | Tsushima |
| 2016/0338676 | A1 * | 11/2016 | Berger ............... G16H 20/40 |
| 2017/0224309 | A1 | 8/2017 | Imamura |
| 2017/0336500 | A1 | 11/2017 | Luo et al. |
| 2018/0003819 | A1 | 1/2018 | Koptenko |
| 2018/0166063 | A1 | 6/2018 | Long et al. |
| 2018/0177491 | A1 | 6/2018 | Hynynen et al. |
| 2018/0296190 | A1 | 10/2018 | Susumu |
| 2018/0333139 | A1 | 11/2018 | Misono |
| 2018/0360420 | A1 | 12/2018 | Vortman et al. |
| 2019/0133556 | A1 | 5/2019 | Koptenko |
| 2020/0033471 | A1 | 1/2020 | Kim et al. |
| 2020/0108412 | A1 | 4/2020 | Greenberg et al. |
| 2020/0268356 | A1 | 8/2020 | Li |
| 2020/0375574 | A1 | 12/2020 | Ling et al. |
| 2022/0163646 | A1 * | 5/2022 | Fraschini ........... G01S 7/52046 |
| 2022/0233890 | A1 | 7/2022 | Hynynen et al. |

FOREIGN PATENT DOCUMENTS

| | | |
|---|---|---|
| CN | 101209211 A | 7/2008 |
| CN | 101664321 A | 3/2010 |
| CN | 101770028 A | 7/2010 |
| CN | 101785684 A | 7/2010 |
| CN | 101900809 A | 12/2010 |
| CN | 102247168 A | 11/2011 |
| CN | 103592618 A | 2/2014 |
| CN | 104020462 A | 9/2014 |
| CN | 105044706 A | 11/2015 |
| CN | 105193453 A | 12/2015 |
| CN | 105787280 A | 7/2016 |
| CN | 106063710 A | 11/2016 |
| CN | 107320129 A | 11/2017 |
| CN | 107374670 A | 11/2017 |
| CN | 108186045 A | 6/2018 |
| CN | 108198610 A | 6/2018 |
| CN | 108354627 A | 8/2018 |
| CN | 108519576 A | 9/2018 |
| CN | 109461193 A | 3/2019 |
| CN | 109975814 A | 7/2019 |
| CN | 111281422 A | 6/2020 |
| CN | 111374696 A | 7/2020 |
| CN | 111436966 A | 7/2020 |
| CN | 111631750 A | 9/2020 |
| CN | 112043379 A | 12/2020 |
| CN | 112401932 A | 2/2021 |
| CN | 113157969 A | 7/2021 |
| CN | 113208710 A | 8/2021 |
| CN | 114052786 A | 2/2022 |
| DE | 3916396 A1 | 11/1990 |
| EP | 1568323 A1 | 8/2005 |
| EP | 2952137 A1 | 12/2015 |
| JP | H11276477 A | 10/1999 |
| JP | 2010005022 A | 1/2010 |
| WO | 2012149489 A2 | 11/2012 |

OTHER PUBLICATIONS

Written Opinion in PCT/CN2020/140621 mailed on Aug. 16, 2021, 4 pages.
International Search Report in PCT/CN2021/131585 mailed on Feb. 15, 2022, 6 pages.
First Office Action in Chinese Application No. 202111232861.9 mailed on Jul. 20, 2022, 15 pages.
Nikolov, Svetoslav Ivanov et al., Practical Applications of Synthetic Aperture Imaging, 2010 IEEE International Ultrasonics Symposium Proceedings, 350-358, 2010.
Jensen, Jorgen Arendt et al., Synthetic Aperture Ultrasound Imaging, Ultrasonics, 44: e5-e15, 2006.
The Extended European Search Report in European Application No. 20951282.1 mailed on Mar. 1, 2024, 8 pages.
Extended European Search Report in European Application No. 21893990.8 mailed on Mar. 6, 2024, 11 pages.
Hou, Shanshan, Study on the Method of Partial Discharge Ultrasonic Array Sensors' Sparse Design, Chinese Master's Theses Full-text Database Engineering Science and Technology Series II, 2015, 66 pages.
Ji, Xiaoxing, Synthetic Aperture Ultrasonic Imaging Algorithm Based on Adaptive Beamforming, Information and Science Technology, 2018, 81 Pages.
Li, Chen, Research on Imaging Quality and Algorithm of Ultrasonic Phased Array, Information and Science Technology, 2018, 74 Pages.
First Office Action in Chinese Application No. 202011308586.X mailed on Mar. 20, 2025, 16 pages.
Jiang, Yuxin et al., Advanced Tutorial on Ultrasound Medicine, People's Military Medical Press, 2012, 39 pages.
First Office Action in Chinese Application No. 202310329356.9 mailed on Aug. 8, 2025, 14 pages.

* cited by examiner

1100

```
Determining a signal sequence of each element of the
at least one region by demodulating an ultrasound       ~ 1110
signal of the element corresponding to the
transmission
                        ↓
Determining, based on the signal sequence of the        ~ 1120
element, a value of each element of the at least one
region corresponding to the transmission
                        ↓
Generating a primary image of the at least one region   ~ 1130
based on the value of each element of the at least one
region
```

```
┌─────────────────────────────────────────────┐
│ Optimizing a signal sequence of each element of at │
│ least one region by performing an interpolation on the │      1710
│ signal sequence based on an interpolation approach │
│ and delay times of the element                     │
└─────────────────────────────────────────────┘
                        ↓
┌─────────────────────────────────────────────┐
│ Determining a value of each element based on the │
│ optimized signal sequence of the element and the │     1720
│ target beamforming parameters of the element     │
│ corresponding to the transmission.               │
└─────────────────────────────────────────────┘
```

| Generating a secondary image of the subject in the at least one region by combining the plurality of primary images corresponding to the plurality of transmissions | 1910 |

↓

| Determining coordinates of pixels in the secondary image with respect to a first coordinate system | 1920 |

↓

| Generating an ultrasonic image of the subject in the at least one region by performing a coordinate conversion on the pixels in the secondary image according to a relationship between the first coordinate system and a second coordinate system | 1930 |

```
┌─────────────────────────────────────────────┐
│ Identifying, from at least one threshold range, a target │
│ threshold range that matches a time difference │         ___ 2510
│ between a detection time of the ultrasound signal and │
│ a transmitting time of the ultrasound signal │
└─────────────────────────────────────────────┘
                        │
                        ▼
┌─────────────────────────────────────────────┐
│ Determining an analog gain compensation coefficient │    ___ 2520
│ corresponding to the ultrasound signal based on the │
│ target threshold range │
└─────────────────────────────────────────────┘
```

Determining two transmission boundaries of the transmission based on the total count of detecting members of the detector, the directivity angle of each detecting member of the detector, and a focus corresponding to the transmission ∕∼ 2810

Determining an intersection between each of the two transmission boundaries of the transmission and a line formed by the detecting members of the detector ∕∼ 2820

Determining a local count of detecting members of the detector on a portion of the line between the two intersections, the local count of the detecting members of the detector being determined as the size of the synthetic aperture for the transmission ∕∼ 2830

FIG. 28

SYSTEM AND METHOD FOR ULTRASOUND IMAGING

CROSS-REFERENCE TO RELATED APPLICATIONS

This application is a Continuation of International Application No. PCT/CN2020/140621, filed on Dec. 29, 2020, which claims priority of Chinese Patent Application No. 202011293102.9, filed on Nov. 18, 2020 and Chinese Patent Application No. 202011308586.X, filed on Nov. 20, 2020, the contents of which are hereby incorporated by reference.

TECHNICAL FIELD

The present disclosure generally relates to medical imaging, and more particularly to an ultrasound imaging system and method.

BACKGROUND

Ultrasound imaging is widely used in clinical applications such as evaluating blood vessels, checking viscera such as thyroid glands, kidneys, etc., assessing joint inflammation, guiding a needle for biopsy or tumor treatment, evaluating metabolic bone diseases, etc. The ultrasound imaging technique uses high-frequency ultrasound waves to produce ultrasound images of structures. However, problems such as a low frequency rate, image nonuniformity, etc., may result in poor quality of the ultrasound images. Thus, it is desirable to develop a system and method for improving the quality of the ultrasound images effectively.

SUMMARY

According to a first aspect of the present disclosure, a method implemented on a computing device having a processor and a computer-readable storage device is provided. The method may comprise obtaining, by the processor, a total count of detecting members of a detector of an ultrasound scanner and a directivity angle of each detecting member of the detector; obtaining, by the processor, one or more focuses each of which corresponds to a transmission of ultrasound waves of the ultrasound scanner, wherein the one or more focuses are located within the detector; determining, by the processor, a synthetic aperture for each of one or more transmissions corresponding to the one or more focuses based on the total count of the detecting members of the detector, the directivity angle of each detecting member of the detector, and the one or more focuses, the synthetic aperture including at least one detecting member of the detector; and directing, by the processor, the ultrasound scanner to scan a subject in the one or more transmissions through the synthetic aperture for each of the one or more transmissions.

In some embodiments, the determining a synthetic aperture for each of one or more transmissions corresponding to the one or more focuses based on the total count of the detecting members of the detector, the directivity angle of each detecting member of the detector, and the one or more focuses includes determining a size of the synthetic aperture for each of the one or more transmissions based on the total count of the detecting members of the detector, the directivity angle of each detecting member of the detector, and the one or more focuses.

In some embodiments, the determining a size of the synthetic aperture for each of the one or more transmissions based on the total count of the detecting members of the detector, the directivity angle of each detecting member of the detector, and the one or more focuses includes: for each of the one or more transmissions, determining two transmission boundaries of the transmission based on the total count of detecting members of the detector, the directivity angle of each detecting member of the detector, and a focus corresponding to the transmission; determining an intersection between each of the two transmission boundaries of the transmission and a line formed by the detecting members of the detector; and determining a local count of detecting members of the detector on a portion of the line between the two intersections; and designating the local count of detecting members of the detector as the size of the synthetic aperture for the transmission.

In some embodiments, sizes of at least two synthetic apertures each corresponding to one of the one or more transmissions are different.

In some embodiments, the method may further include obtaining, by the processor, ultrasound signals corresponding to the one or more transmissions from the detector of the ultrasound scanner; and generating, by the processor, an ultrasound image of the subject based on the ultrasound signals of the one or more transmissions.

In some embodiments, the generating an ultrasound image of the subject based on the ultrasound signals corresponding to the one or more transmissions includes: performing attenuation compensation on the ultrasound signals; generating the ultrasound image of the subject based on the compensated ultrasound signals.

In some embodiments, the performing attenuation compensation on the ultrasound signals includes: for each of the ultrasound signals corresponding to the one or more transmissions, determining a first gain compensation coefficient based on a detection time of the ultrasound signal and a transmitting time of a transmission corresponding to the ultrasound signal; and performing a primary attenuation compensation on the ultrasound signal based on the first gain compensation coefficient.

In some embodiments, the determining a first gain compensation coefficient based on a detection time of the ultrasound signal and a transmitting time of a transmission corresponding to the ultrasound signal includes determining a time difference between the detection time of the ultrasound signal and the transmitting time of the transmission corresponding to the ultrasound signal; identifying, from at least one threshold range, a target threshold range that matches the time difference; and determining the first gain compensation coefficient based on the target threshold range.

In some embodiments, the determining a first gain compensation coefficient based on a detection time of the ultrasound signal and a transmitting time of a transmission corresponding to the ultrasound signal includes determining a time difference between the detection time of the ultrasound signal and the transmitting time of the transmission corresponding to the ultrasound signal; determining whether the time difference exceeds a time difference threshold; in response to the determining that the time difference exceeds the time difference threshold, determining that the first gain compensation coefficient is positive.

In some embodiments, the method may further include in response to the determining that the time difference is below the time difference threshold, determining that the first gain compensation coefficient is negative.

In some embodiments, the method may further include in response to the determining that the time difference equals to the time difference threshold, determining the first gain compensation coefficient as 1.

In some embodiments, the first gain compensation coefficient for the ultrasound signal is stored in a ring memory according to a data storage rule, the data storage rule including storing a transmission instruction corresponding to the ultrasound signal, a compensation instruction associated with the first gain compensation coefficient, and an instruction regarding detecting the ultrasound signal in successive storage units of the ring memory sequentially.

In some embodiments, the method may further include: for each of the ultrasound signals corresponding to the one or more transmissions, determining a second gain compensation coefficient based on a depth of the subject; and performing a secondary attenuation compensation on the ultrasound signal based on the second gain compensation coefficient.

According to a second aspect of the present disclosure, a method implemented on a computing device having a processor and a computer-readable storage device is provided. The method may comprise obtaining ultrasound signals of elements of at least one region, wherein the ultrasound signals are generated based on a scanning protocol, the scanning protocol including far-field virtual focuses of a plurality of transmissions of ultrasound waves from an ultrasound scanner and an interval between each pair of consecutive transmissions of the plurality of transmissions; generating a plurality of primary images of the at least one region corresponding to the plurality of transmissions, each of the plurality of primary images being generated by beamforming an ultrasound signal of each element of the at least one region corresponding to one of the plurality of transmissions; and generating an ultrasonic image of a subject located in the at least one region based on the plurality of primary images corresponding to the plurality of transmissions.

In some embodiments, the generating a plurality of primary images of the at least one region corresponding to the plurality of transmissions includes: for each of the plurality of transmissions, determining a signal sequence of each element of the at least one region by demodulating an ultrasonic signal of the element corresponding to the transmission; determining, based on the signal sequence of the element, a value of each element of the at least one region corresponding to the transmission; and generating a primary image of the at least one region corresponding to the transmission based on the value of each element of the at least one region.

In some embodiments, the determining, based on the signal sequence of the element, a value of each element of the at least one region corresponding to the transmission includes determining target beamforming parameters of each element of the at least one region corresponding to the transmission; and determining the value of each element based on the signal sequence of the element and the target beamforming parameters of the element corresponding to the transmission.

In some embodiments, the target beamforming parameters of each element include at least one of a total count of detecting members of a detector of the ultrasound scanner, delay times regarding the element, angular weights of the element, or a distance weight of the element, and the determining the value of each element based on the signal sequence of the element and the target beamforming parameters of the element includes determining the value of each element based on the signal sequence of the element and at least one of the target beamforming parameters of the element.

In some embodiments, the delay times of the element are determined based on coordinates of each of the detecting members, coordinates of the elements, and coordinates of a far-field virtual focus corresponding to the transmission.

In some embodiments, the angular weights of the element are determined based on angles between normal directions of the detecting elements of the detector and a target direction of the ultrasound signal of the element.

In some embodiments, the distance weight of the element is determined based on coordinates of the element and coordinates of a far-field virtual focus corresponding to the transmission.

In some embodiments, the determining target beamforming parameters of each element of the at least one region corresponding to the transmission includes obtaining a type of a detector of the ultrasound scanner; and identifying the target beamforming parameters of each element of the at least one region from a mapping table according to the type of the detector, wherein the mapping table includes correspondence relationships between beamforming parameters of elements of the at least one region and a plurality of types of the detector.

In some embodiments, the method may further include performing an interpolation on the signal sequence of each element of the at least one region based on an interpolation approach and delay times of the element, wherein the value of each element of the at least one region is determined based on the interpolated signal sequence of the element.

In some embodiments, the plurality of transmissions of ultrasound waves of the ultrasound scanner are from one or more detecting members of a convex array detector of the ultrasound scanner, and the generating an ultrasonic image of a subject in the at least one region based on the plurality of primary images corresponding to the plurality of transmissions includes generating a secondary image of the subject in the at least one region by combining the plurality of primary images corresponding to the plurality of transmissions; determining coordinates of pixels in the secondary image with respect to a first coordinate system, wherein an origin of the first coordinate system is located at a mid-point of a tangent line segment of at least one central detecting member of the detecting members of the detector; and generating the ultrasonic image of the subject in the at least one region by performing a coordinate conversion on the pixels in the secondary image according to a relationship between the first coordinate system and a second coordinate system, wherein an origin of the second coordinate system is located at a center point of the convex array detector.

According to a third aspect of the present disclosure, a system is provided. The system may comprise at least one storage medium including a set of instructions; and at least one processor configured to communicate with the at least one storage medium, wherein when executing the set of instructions. The at least one processor may be configured to direct the system to perform operations including obtaining, by the processor, a total count of detecting members of a detector of an ultrasound scanner and a directivity angle of each detecting member of the detector; obtaining, by the processor, one or more focuses each of which corresponds to a transmission of ultrasound waves of the ultrasound scanner, wherein the one or more focuses are located within the detector; determining, by the processor, a synthetic aperture for each of one or more transmissions corresponding to the one or more focuses based on the total count of the detecting members of the detector, the directivity angle of each detecting member of the detector, and the one or more focuses, the synthetic aperture including at least one detecting member of the detector; and directing, by the processor, the ultrasound scanner to scan a subject in the one or more transmissions through the synthetic aperture for each of the one or more transmissions.

According to a fourth aspect of the present disclosure, a system is provided. The system may comprise at least one storage medium including a set of instructions; and at least one processor configured to communicate with the at least one storage medium, wherein when executing the set of instructions. The at least one processor may be configured to direct the system to perform operations including obtaining ultrasound signals of elements of at least one region, wherein the ultrasound signals are generated based on a scanning protocol, the scanning protocol including far-field virtual focuses of a plurality of transmissions of ultrasound waves from an ultrasound scanner and an interval between each pair of consecutive transmissions of the plurality of transmissions; generating a plurality of primary images of the at least one region corresponding to the plurality of transmissions, each of the plurality of primary images being generated by beamforming an ultrasound signal of each element of the at least one region corresponding to one of the plurality of transmissions; and generating an ultrasonic image of a subject located in the at least one region based on the plurality of primary images corresponding to the plurality of transmissions.

According to a fifth aspect of the present disclosure, a non-transitory readable medium is provided. The non-transitory readable medium may comprise at least one set of instructions, wherein when executed by at least one processor of a computing device, the at least one set of instructions directs the at least one processor to perform a method. The method may comprise obtaining, by the processor, a total count of detecting members of a detector of an ultrasound scanner and a directivity angle of each detecting member of the detector; obtaining, by the processor, one or more focuses each of which corresponds to a transmission of ultrasound waves of the ultrasound scanner, wherein the one or more focuses are located within the detector; determining, by the processor, a synthetic aperture for each of one or more transmissions corresponding to the one or more focuses based on the total count of the detecting members of the detector, the directivity angle of each detecting member of the detector, and the one or more focuses, the synthetic aperture including at least one detecting member of the detector; and directing, by the processor, the ultrasound scanner to scan a subject in the one or more transmissions through the synthetic aperture for each of the one or more transmissions.

According to a sixth aspect of the present disclosure, a non-transitory readable medium is provided. The non-transitory readable medium may comprise at least one set of instructions, wherein when executed by at least one processor of a computing device, the at least one set of instructions directs the at least one processor to perform a method. The method may comprise obtaining ultrasound signals of elements of at least one region, wherein the ultrasound signals are generated based on a scanning protocol, the scanning protocol including far-field virtual focuses of a plurality of transmissions of ultrasound waves from an ultrasound scanner and an interval between each pair of consecutive transmissions of the plurality of transmissions; generating a plurality of primary images of the at least one region corresponding to the plurality of transmissions, each of the plurality of primary images being generated by beamforming an ultrasound signal of each element of the at least one region corresponding to one of the plurality of transmissions; and generating an ultrasonic image of a subject located in the at least one region based on the plurality of primary images corresponding to the plurality of transmissions.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 11 is a flowchart illustrating an exemplary process for generate a primary image of at least one region corresponding to a transmission of ultrasound waves according to some embodiments of the present disclosure;

FIG. 17 is a flowchart illustrating an exemplary process for optimizing a signal sequence of each element of the at least one region according to some embodiments of the present disclosure;

FIG. 19 is a flowchart illustrating an exemplary process for generating an ultrasound image of a subject according to some embodiments of the present disclosure;

FIG. 25 is a flowchart illustrating an exemplary process for determining an analog gain compensation coefficient corresponding to an ultrasound signal according to some embodiments of the present disclosure;

FIG. 28 is a flowchart illustrating an exemplary process for determining a size of the synthetic aperture for the transmission according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
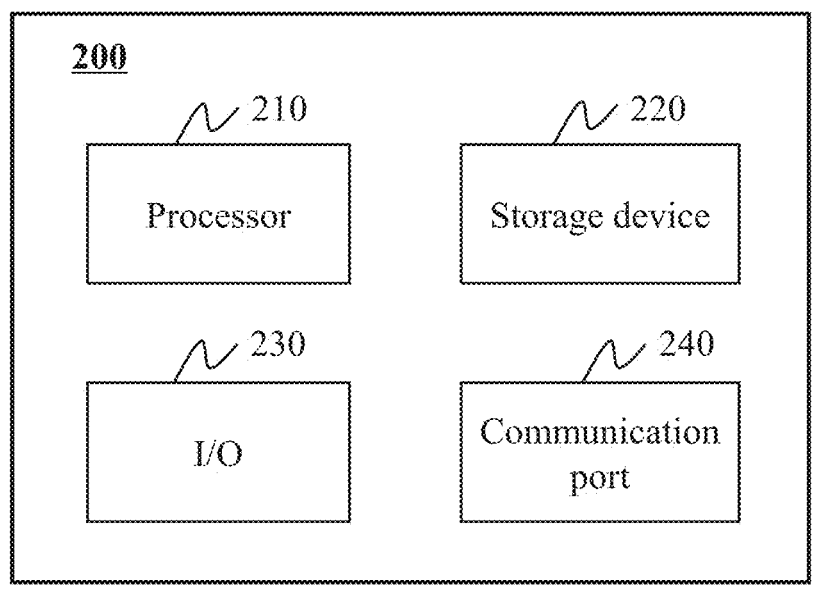
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/ units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and methods for non-invasive imaging, such as for disease diagnosis, treatment, and/or research purposes. In some embodiments, the imaging system may include a single modality system and/or a multi-modality system. The term "modality" used herein broadly refers to an imaging or treatment method or technology that gathers, generates, processes, and/or analyzes imaging information of a subject or treatments the subject. The single modality system may include an ultrasound (US) imaging system. The multi-modality system may include an X-ray imaging-ultrasound imaging (X-ray-US) system, a positron emission tomography-ultrasound imaging (PET-US) system, a single photon emission computed tomography-ultrasound imaging (SPECT-US) system, a computed tomography-ultrasound imaging (CT-US) system, a magnetic resonance-ultrasound imaging (MR-US) system, or the like, or any combination thereof.

In the present disclosure, the term "image" refers to a two-dimensional (2D) image, a three-dimensional (3D) image, or a four-dimensional (4D) image. In some embodiments, the term "image" refers to an image of a region (e.g., a region of interest (ROI)) of a subject. As described above, the image may be a CT image, a PET image, an MR image, a fluoroscopy image, an ultrasound image, an Electronic Portal Imaging Device (EPID) image, etc.

As used herein, a representation of a subject (e.g., a patient, or a portion thereof) in an image may be referred to as the subject for brevity. For instance, a representation of an organ or tissue (e.g., the heart, the liver, a lung, etc., of a patient) in an image may be referred to as the organ or tissue for brevity. An image including a representation of a subject may be referred to as an image of the subject or an image including the subject for brevity. As used herein, an operation on a representation of a subject in an image may be referred to as an operation on the subject for brevity. For instance, a segmentation of a portion of an image including a representation of an organ or tissue (e.g., the heart, the liver, a lung, etc., of a patient) from the image may be referred to as a segmentation of the organ or tissue for brevity.

According to an aspect of the present disclosure, the disclosure is directed to systems and methods for ultrasound imaging. During the ultrasound imaging process, ultrasound signals of elements of at least one region corresponding to a plurality of transmissions of ultrasound waves from a scanner may be obtained. A plurality of primary images of the at least one region corresponding to the plurality of transmissions may be generated by beamforming the obtained ultrasound signals. An ultrasonic image of a subject located in the at least one region may be generated based on the plurality of primary images corresponding to the plurality of transmissions. The ultrasound signals may be generated based on a scanning protocol. The scanning protocol including far-field virtual focuses of the plurality of transmissions of ultrasound waves. The far-field virtual focuses may be virtual focus outside the imaging region of the detector of the scanner 110. By setting the far-field virtual focuses, a scanning range of each of the plurality of transmissions may be enlarged, and the count or number of the transmissions and the scanning interval between each pair of consecutive transmissions of the plurality of transmissions may be reduced, thereby improving the efficiency of the ultrasound scanning and the frame rate of the ultrasound imaging. In addition, the beamforming may be associated with the at least one region, instead of scanning lines. Thus, the quality of the ultrasound image of the subject may also be improved.

Figure 1:
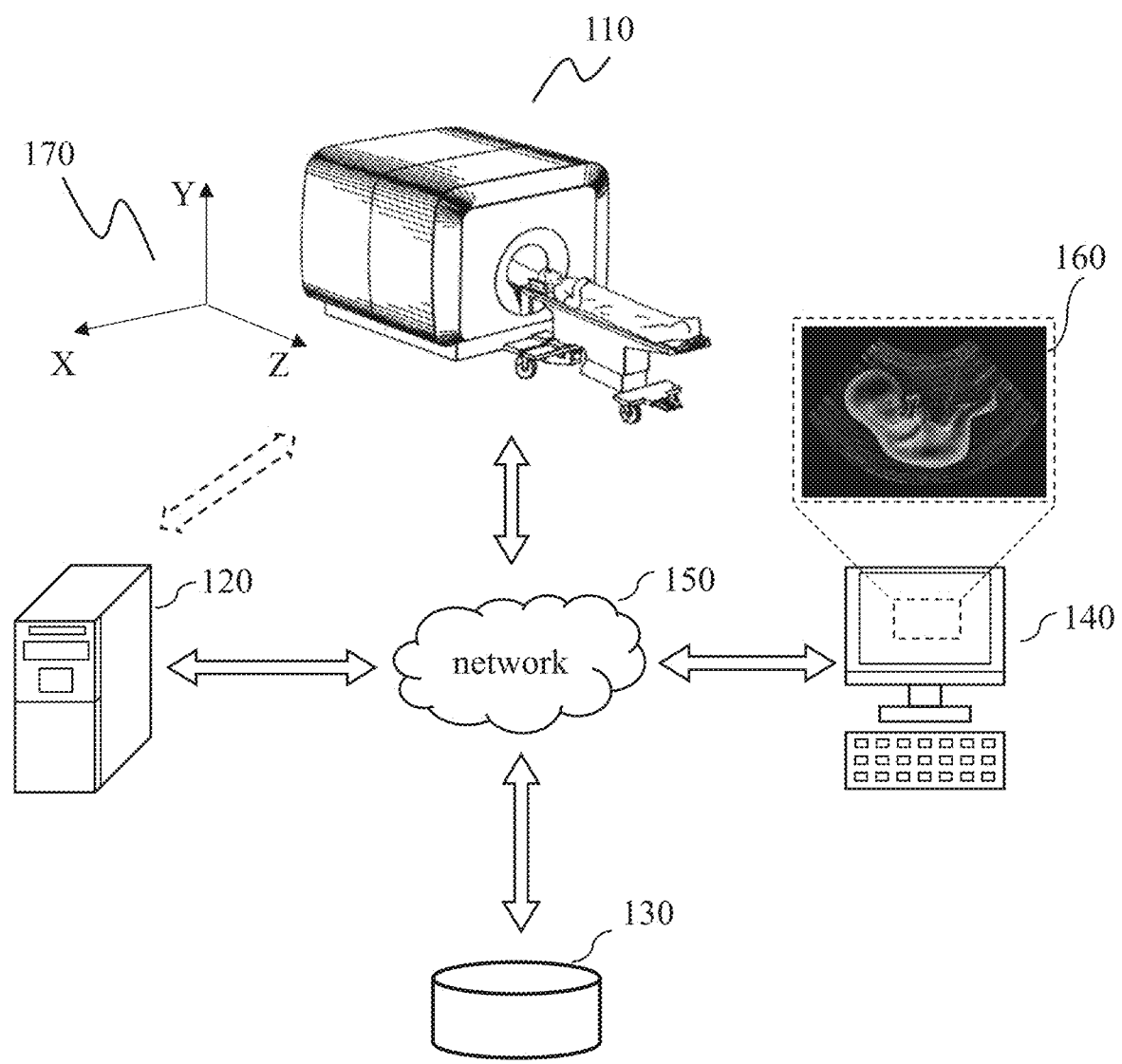
FIG. 1 is a schematic diagram illustrating an exemplary imaging system according to some embodiments of the present disclosure.

FIG. 1 is a schematic diagram illustrating an exemplary imaging system according to some embodiments of the present disclosure. As illustrated in FIG. 1, the imaging system 100 may include a scanner 110, a processing device 120, a storage device 130, a terminal device 140, and a network 150. In some embodiments, two or more components of the imaging system 100 may be connected to and/or communicate with each other via a wireless connection, a wired connection, or a combination thereof. The connection among the components of the imaging system 100 may be variable. Merely by way of example, the scanner 110 may be connected to the processing device 120 through the network 150 or directly. As another example, the storage device 130 may be connected to the processing device 120 through the network 150 or directly.

The scanner 110 may be configured to scan a subject or a portion thereof and generate ultrasound signals related to the (portion of) subject. In some embodiments, the scanner 110 may include a single modality device. For example, the scanner 110 may include an ultrasound (US) scanner. In some embodiments, the scanner 110 may be a multi-modality device. For example, the scanner 110 may include a PET-US scanner, an MR-US scanner, a CT-US scanner, a SPECT-US scanner, or the like, or a combination thereof. The following descriptions are provided, unless otherwise stated expressly, with reference to a US scanner for illustration purposes and not intended to be limiting.

Merely for illustration, the scanner 110 may include a table and a detector (not shown in the figure). The subject may be placed on the table for scanning. The detector may include one or more detecting members. The one or more detecting members or a portion thereof may transmit ultrasound waves to the subject, and/or receive ultrasound waves reflected back from the subject. The scanner 110 may generate the ultrasound signals based on the reflected ultrasound waves. The detector may be of one of various types. Exemplary detectors may include a piezoelectric ceramic detector, a single crystal type, etc.

In some embodiments, the detector may be a linear array detector, a convex array detector, etc., including a transducer array. The one or more detecting members may be elements of the transducer array. In some embodiments, the detector may also include an analog front end (AFE) having integrated analog-to-digital (AD) converters, and/or an interface for transmitting analog or digital signals to the processing device 120.

The processing device 120 may process data and/or information. The data and/or information may be obtained from the scanner 110 or retrieved from the storage device 130, the terminal device 140, and/or an external device (external to the imaging system 100) via the network 150. For example, the processing device 120 may process the ultrasound signals obtained from the scanner 110, and reconstruct an ultrasound image based on the processed ultrasound signals. In some embodiments, the processing device 120 may be a single server or a server group. The server group may be centralized or distributed. In some embodiments, the processing device 120 may be local or remote. For example, the processing device 120 may access information and/or data stored in the scanner 110, the terminal device 140, and/or the storage device 130 via the network 150. As another example, the processing device 120 may be directly connected to the scanner 110, the terminal device 140, and/or the storage device 130 to access stored information and/or data. In some embodiments, the processing device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 120 may be implemented by a computing device 200 having one or more components as illustrated in FIG. 2.

In some embodiments, the processing device 120 may include various components to implement exemplary methods described in the present disclosure. For example, the processing device 120 may include an AFE circuit, a field programmable gate array (FPGA) controller, a transmitting and/or receiving circuit, and an AD convertor, or the like, or any combination thereof.

The storage device 130 may store data, instructions, and/or any other information. In some embodiments, the storage device 130 may store data obtained from the scanner 110, the terminal device 140, and/or the processing device 120. In some embodiments, the storage device 130 may store data and/or instructions that the processing device 120 may execute or use to perform exemplary methods described in the present disclosure. In some embodiments, the storage device 130 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components (e.g., the processing device 120, the terminal device 140) of the imaging system 100. One or more components of the imaging system 100 may access the data or instructions stored in the storage device 130 via the network 150. In some embodiments, the storage device 130 may be directly connected to or communicate with one or more other components (e.g., the processing device 120, the terminal device 140) of the imaging system 100. In some embodiments, the storage device 130 may be part of the processing device 120.

The terminal device 140 may input/output signals, data, information, etc. In some embodiments, the terminal device 140 may enable a user interaction with the processing device 120. For example, the terminal device 140 may display an ultrasound image of the subject on a screen 160. As another example, the terminal device 140 may obtain a user's input information through an input device (e.g., a keyboard, a touch screen, a brain wave monitoring device), and transmit the input information to the processing device 120 for further processing. The terminal device 140 may be a mobile device, a tablet computer, a laptop computer, a desktop computer, or the like, or any combination thereof. In some embodiments, the mobile device may include a home device, a wearable device, a virtual reality device, an augmented reality device, or the like, or any combination thereof. The home device may include a lighting device, a control device of an intelligent electrical apparatus, a monitoring device, a television, a video camera, an interphone, or the like, or any combination thereof. The wearable device may include a bracelet, a footgear, eyeglasses, a helmet, a watch, clothing, a backpack, an accessory, or the like, or any combination thereof. The virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal device 140 may be part of the processing device 120 or a peripheral device of the processing device 120 (e.g., a console connected to and/or communicating with the processing device 120).

The network 150 may include any suitable network that can facilitate the exchange of information and/or data for the imaging system 100. In some embodiments, one or more components (e.g., the scanner 110, the terminal device 140, the processing device 120, the storage device 130) of the imaging system 100 may communicate information and/or data with one or more other components of the imaging system 100 via the network 150. The network 150 may be and/or include a public network (e.g., the Internet), a private network (e.g., a local area network (LAN), a wide area network (WAN))), a wired network (e.g., an Ethernet network), a wireless network (e.g., an 802.11 network, a Wi-Fi network), a cellular network (e.g., a Long Term Evolution (LTE) network, 4G network, 5G network), a frame relay network, a virtual private network (VPN), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the imaging system 100 may be connected to the network 150 to exchange data and/or information.

For illustration purposes, a coordinate system 170 is provided in FIG. 1. The coordinate system 170 may be a Cartesian system including an X-axis, a Y-axis, and a Z-axis. The X-axis and the Y-axis shown in FIG. 1 may be horizontal and the Z-axis may be vertical. As illustrated, the positive X direction along the X-axis may be from the left side to the right side of the table viewed from the direction facing the front of the scanner 110; the positive Y direction along the Y-axis shown in FIG. 1 may be from the end to the head of the table; the positive Z direction along the Z-axis shown in FIG. 1 may be from the lower part to the upper part of the scanner 110.

It should be noted that the above description regarding the imaging system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the imaging system 100 may include one or more additional components and/or one or more components of the imaging system 100 described above may be omitted. In some embodiments, a component of the imaging system 100 may be implemented on two or more sub-components. Two or more components of the imaging system 100 may be integrated into a single component.

FIG. 2 is a schematic diagram illustrating exemplary hardware and/or software components of an exemplary computing device according to some embodiments of the present disclosure. The computing device 200 may be configured to implement any component of the imaging system 100. For example, the scanner 110, the processing device 120, the storage device 130, and/or the terminal device 140 may be implemented on the computing device 200. Although only one such computing device is shown for convenience, the computer functions relating to the imaging system 100 as described herein may be implemented in a distributed fashion on a number of similar platforms, to distribute the processing load. As illustrated in FIG. 2, the computing device 200 may include a processor 210, a storage device 220, an input/output (I/O) 230, and a communication port 240.

The processor 210 may execute computer instructions (e.g., program codes) and perform functions of the processing device 120 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal device 140 and/or the storage device 130. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage device 220 may store data/information obtained from the scanner 110, the terminal device 140, the storage device 130, or any other component of the imaging system 100. In some embodiments, the storage device 220 may include a mass storage device, a removable storage device, a volatile read-and-write memory, a read-only memory (ROM), or the like, or any combination thereof. In some embodiments, the storage device 220 may store one or more programs and/or instructions to perform exemplary methods described in the present disclosure.

The I/O 230 may input or output signals, data, and/or information. In some embodiments, the I/O 230 may enable user interaction with the processing device 120. In some embodiments, the I/O 230 may include an input device and an output device. Exemplary input devices may include a keyboard, a mouse, a touch screen, a microphone, a camera capturing gestures, or the like, or a combination thereof. Exemplary output devices may include a display device, a loudspeaker, a printer, a projector, a 3D hologram, a light, a warning light, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 150) to facilitate data communications. The communication port 240 may establish connections between the processing device 120 and the scanner 110, the terminal device 140, or the storage device 130. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
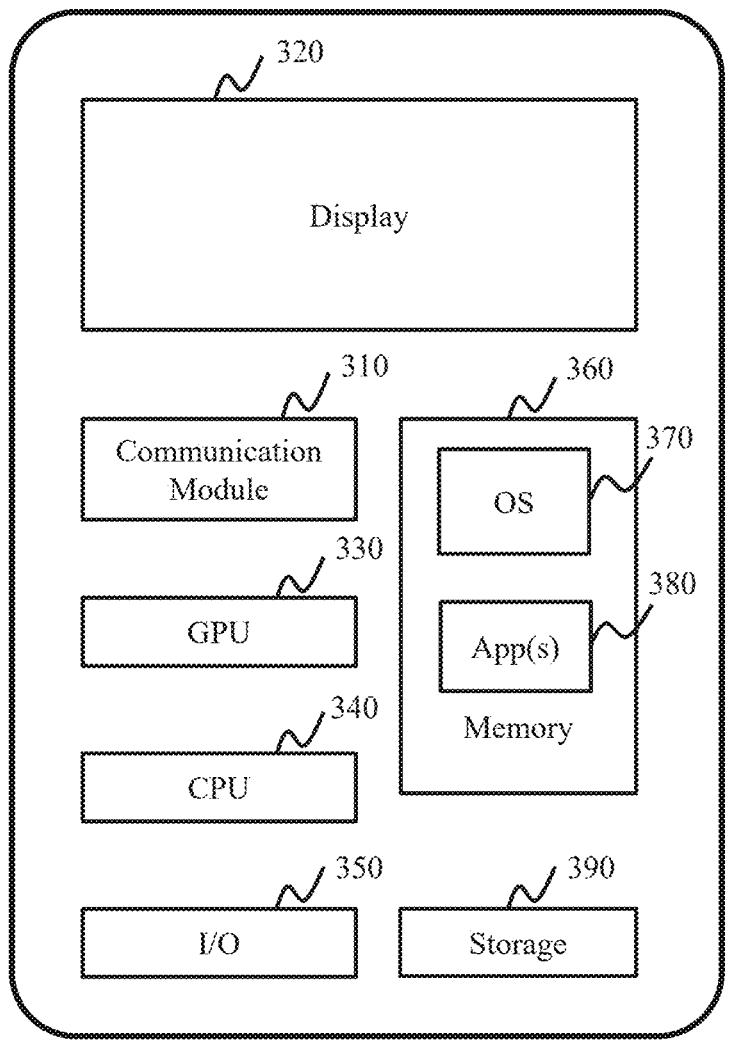
FIG. 3 is a block diagram illustrating exemplary hardware and/or software components of an exemplary requestor terminal according to some embodiments of the present disclosure.

FIG. 3 is a schematic diagram illustrating exemplary hardware and/or software components of an exemplary mobile device according to some embodiments of the present disclosure. In some embodiments, the processing device 120 or the terminal device 140 may be implemented on the mobile device 300. As illustrated in FIG. 3, the mobile device 300 may include a communication module 310, a display 320, a graphics processing unit (GPU) 330, a central processing unit (CPU) 340, an I/O 350, a memory 360, and storage 390. The CPU 340 may include interface circuits and processing circuits similar to the processor 210. In some embodiments, any other suitable component, including but not limited to a system bus or a controller (not shown), may also be included in the mobile device 300. In some embodiments, a mobile operating system 370 (e.g., iOS™, Android™, Windows Phone) and one or more applications 380 may be loaded into the memory 360 from the storage 390 in order to be executed by the CPU 340. The applications 380 may include a browser or any other suitable mobile apps for receiving and rendering information relating to imaging from the imaging system on the mobile device 300. User interactions with the information stream may be achieved via the I/O devices 350 and provided to the processing device 120 and/or other components of the imaging system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
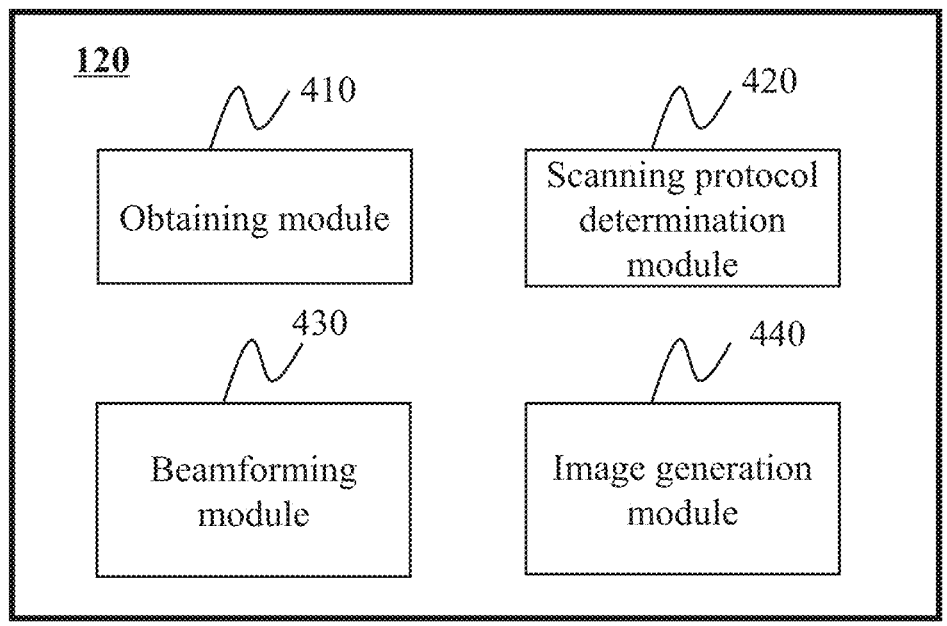
FIG. 4 is a block diagram illustrating an exemplary processing device according to some embodiments of the present disclosure.

FIG. 4 is a block diagram illustrating an exemplary processing device according to some embodiments of the present disclosure. As illustrated in FIG. 4, the processing device 120 may include an obtaining module 410, a scanning protocol determination module 420, a beamforming module 430, and an image generation module 440.

The obtaining module 410 may obtain data or information. The obtaining module 410 may obtain data and/or information from the scanner 110, the storage device 130, the terminal(s) 140, or any devices or components capable of storing data via the network 150. In some embodiments, the obtaining module 410 may obtain ultrasound signals of elements of at least one region corresponding to a plurality of transmissions of ultrasound waves from a scanner. In some embodiments, the ultrasound signals may be generated based on a scanning protocol. The scanning protocol may include far-field virtual focuses of a plurality of transmissions of ultrasound waves from an ultrasound scanner and an interval between each pair of consecutive transmissions of the plurality of transmissions. In some embodiments, a far-field virtual focus may be a virtual focus outside an imaging region of the detector of the scanner 110.

The obtaining module 410 may obtain a total count of detecting members of the detector of the scanner and a directivity angle of each detecting member of the detector. The total count of the plurality of detecting members may relate to a type of the detector. In some embodiments, the processing device 120 may obtain the total count of the plurality of detecting members from a user (e.g., a doctor, a technician, etc.). In some embodiments, the processing device 120 may obtain the total count of the plurality of detecting members from one or more components of the imaging system 100. The directivity angle of a detecting member refers to a transmitting angle of ultrasound waves generated by the detecting member. The directivity angle may be within a specific angle range so as to avoid the aliasing effect.

The obtaining module 410 may also obtain one or more focuses each of which corresponds to a transmission of ultrasound waves of a scanner. In some embodiments, the one or more focuses may be the far-field virtual focuses of a plurality of transmissions of ultrasound waves or virtual focuses located within the detector.

In some embodiments, the obtained data and/or information may further include processed results, user instructions, algorithms, parameters (e.g., scanning protocols), program codes, information of one or more subject, or the like, or a combination thereof.

The scanning protocol determination module 420 may determine a scanning protocol for scanning a subject. The scanning protocol may be a plan or strategy for scanning the subject in the at least one region using the plurality of transmissions of ultrasound waves from the scanner 110. In some embodiments, the scanning protocol may include scanning parameters of the scanner 110, an imaging mode (A-scan, B-scan, C-scan, etc.) of the scanner 110, the part of a subject (e.g., a patient) to be scanned, a size of an imaging region, position information of the imaging region, a synthetic aperture of the detector of the scanner, information regarding image contrast and/or ratio, or the like, or any combination thereof. In some embodiments, the scanning parameters of the scanner 110 may include focuses of the plurality of transmissions of ultrasound waves from the scanner 110, a frame rate, a scanning depth, a scanning frequency, and/or a scanning angle of each of the plurality of transmissions, an interval between each pair of consecutive transmissions of the plurality of transmissions, a transmitting power of each of the plurality of transmissions, etc. In some embodiments, the at least one region may be within the imaging region. In some embodiments, the scanning protocol may be determined by a user (e.g., a doctor, a technician), according to default settings of the imaging system, etc.

The scanning protocol determination module 420 may determine a synthetic aperture for each of one or more transmissions corresponding to one or more focuses. The synthetic aperture may be an equivalent aperture of the detector including at least one detecting member for transmitting ultrasound waves towards the imaging region. The synthetic aperture may relate to the count (or number) and the positions of detecting members involved in a transmission, and define the detecting members involved in a transmission. In some embodiments, the scanning protocol determination module 420 may determine the synthetic aperture for each of the one or more transmissions based on the total count of the detecting members of the detector, the directivity angle of each detecting member of the detector, and the one or more focuses.

The beamforming module 430 may perform a beamforming operation on ultrasound signals corresponding to a transmission. Merely by way of example, the beamforming operation may be implemented as an analog-to-digital conversion, a signal extraction, a signal analysis, a signal interpolation, etc. A primary image corresponding to each of the one or more transmissions may be generated after the beamforming operation is performed on the ultrasound signals corresponding to the transmission.

The image generation module 440 may generate an ultrasound image of the subject located in the at least one region. In some embodiments, the image generation module 440 may generate the ultrasound image of the subject based on a plurality of primary images corresponding to a plurality of transmissions. For example, the plurality of primary images corresponding to the plurality of transmissions may be combined (using e.g., a coherent composition, an incoherent composition, a weighted composition, etc.) into a combined image. In some embodiments, the combined image may be designated as the ultrasound image of the subject.

The modules in the processing device 120 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the above-mentioned modules may be integrated into a console (not shown). Via the console, a user may set parameters for scanning a subject, controlling imaging processes, adjusting reconstruction protocols for reconstruction of an image, viewing images, etc. As another example, the processing device 120 may include a storage module (not shown) configured to store information and/or data (e.g., ultrasound signals, images) associated with the above-mentioned modules.

Figure 5:
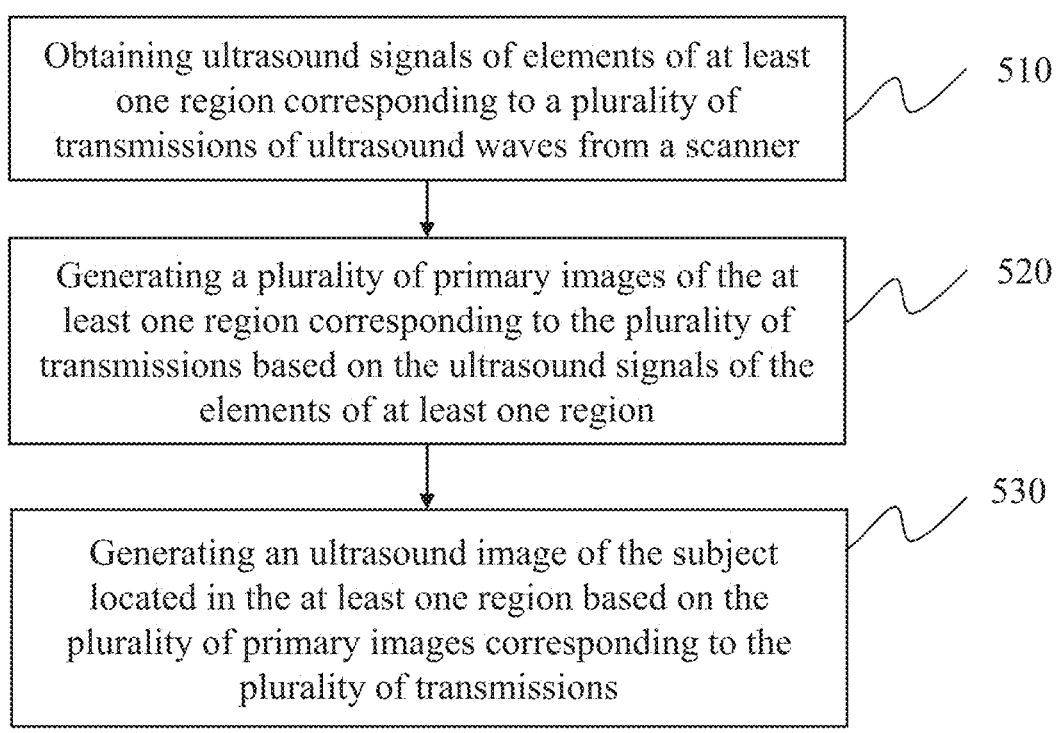
FIG. 5 is a flowchart illustrating an exemplary process for generating an ultrasound image of a subject according to some embodiments of the present disclosure.

FIG. 5 is a flowchart illustrating an exemplary process for generating an ultrasound image of a subject according to some embodiments of the present disclosure. In some embodiments, the process 500 may be executed by the imaging system 100. For example, the process 500 may be implemented as a set of instructions (e.g., an application) stored in a storage device (e.g., the storage device 130). The modules described in FIG. 4 and/or the processor 210 may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410 or the processor 210) may obtain ultrasound signals of elements of at least one region corresponding to a plurality of transmissions of ultrasound waves from a scanner.

As used herein, an element refers to a physical point or sub-region in the at least one region. In some embodiments, the elements of the at least one region may have a same size and/or shape. In some embodiments, at least two of the elements of the at least one region may have different sizes and/or shapes. The sizes and/or shapes of the elements of the at least one region may be determined by a user, according to default settings of the imaging system 100, etc. In some embodiments, an element may correspond to one or more pixels (for a two-dimensional (2D) image) or voxels (for a three-dimensional (3D) image) of an image of the at least one region. Merely by way of example, if an image of the at least one region has a resolution of 480×320 pixels. The at least one region may be divided into 480×320 elements. The elements of the at least one region may have a shape of, e.g., a square.

The ultrasound signals may be generated based on a scanning protocol. As used herein, a scanning protocol refers to a plan or strategy for scanning a subject in the at least one region using the plurality of transmissions of ultrasound waves from the scanner 110. In some embodiments, the scanning protocol may include scanning parameters of the scanner 110, an imaging mode (A-scan, B-scan, C-scan, etc.) of the scanner 110, the part of a subject (e.g., a patient) to be scanned, a size of an imaging region, position information of the imaging region, information regarding image contrast and/or ratio, or the like, or any combination thereof. In some embodiments, the scanning parameters of the scanner 110 may include focuses of the plurality of transmissions of ultrasound waves from the scanner 110, a frame rate, a scanning depth, a scanning frequency, and/or a scanning angle of each of the plurality of transmissions, an interval between each pair of consecutive transmissions of the plurality of transmissions, a transmitting power of each of the plurality of transmissions, etc. In some embodiments, the at least one region may be within the imaging region. In some embodiments, the scanning protocol may be determined by a user (e.g., a doctor, a technician), according to default settings of the imaging system, etc. More details regarding the determination of the scanning protocol can be found elsewhere in the present disclosure. See, for example, FIG. 20 and the descriptions thereof.

Figure 6:
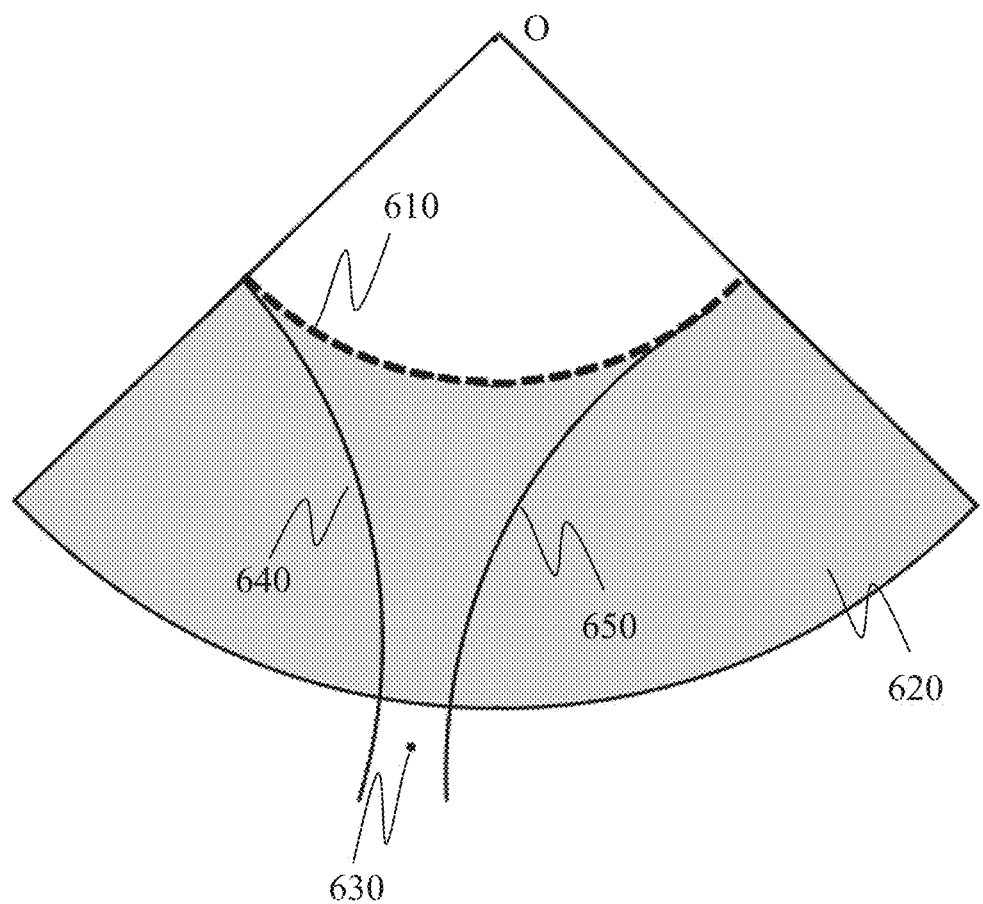
FIG. 6 illustrates an exemplary far-field virtual focus of the convex array detector according to some embodiments of the present disclosure.

In some embodiments, the focuses described in FIGS. 5-21 may be far-field virtual focuses. As used herein, a far-field virtual focus refers to a virtual focus outside the imaging region of the detector of the scanner 110. Merely for illustration purposes, a convex array detector may be provided as an example. FIG. 6 illustrates an exemplary far-field virtual focus of the convex array detector according to some embodiments of the present disclosure. The convex array detector may include a plurality of detecting members (also referred to as array elements, represented by short lines in bold in the figure). The plurality of detecting members may be arranged in a convex 610 with a center O. As shown in FIG. 6, a shadow region 620 may represent an imaging region of the convex array detector. A far-field virtual focus 630 of the convex array detector may be outside the shadow region 620.

Figure 7A:
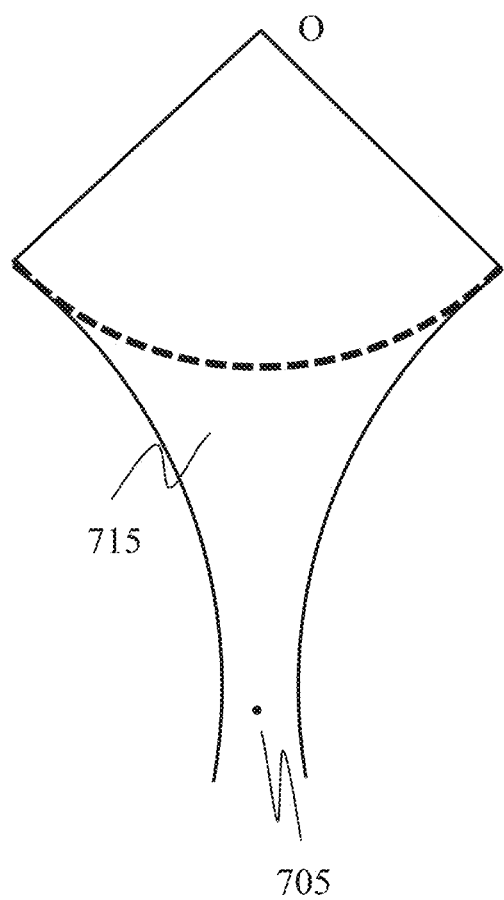
FIG. 7A illustrates an exemplary scanning range corresponding to a far-field virtual focus.
Figure 7B:
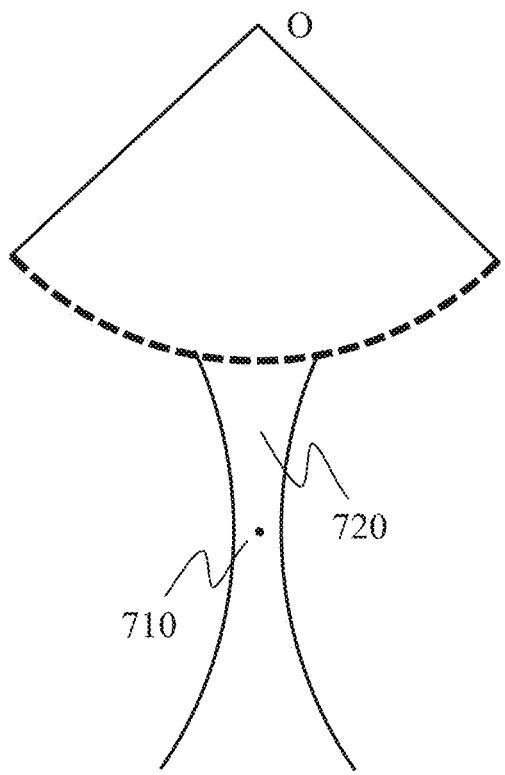
FIG. 7B illustrates an exemplary scanning range corresponding to a near-field virtual focus.

In comparison with a near-field virtual focus, a scanning range (e.g., represented by two curves 640 and 650 representing two boundaries of the scanning range) of a transmission corresponding to a far-field virtual focus may be larger. The scanning range used herein refers to an effective scanning range. The near-field virtual focus refers to a focus within the imaging region of the detector of the scanner 110. An exemplary scanning range corresponding to a far-field virtual focus may be illustrated in FIG. 7A. The convex array detector may include a plurality of detecting members represented by short lines in bold. The plurality of detecting members may be arranged in a convex with a center O. The far-field virtual focus 705 may correspond to a scanning range 715. An exemplary scanning range corresponding to a near-field virtual focus may be illustrated in FIG. 7B. The convex array detector may include a plurality of detecting members represented by short lines in bold. The plurality of detecting members may be arranged in a convex with a center O. The near-field virtual focus 710 may correspond to a scanning range 720. As shown in FIGS. 7A and 7B, the scanning range 715 may be larger than the scanning range 720. Accordingly, a scanning range of a transmission may be enlarged by changing the focus corresponding to the transmission from near-field to far-field.

Figure 8:
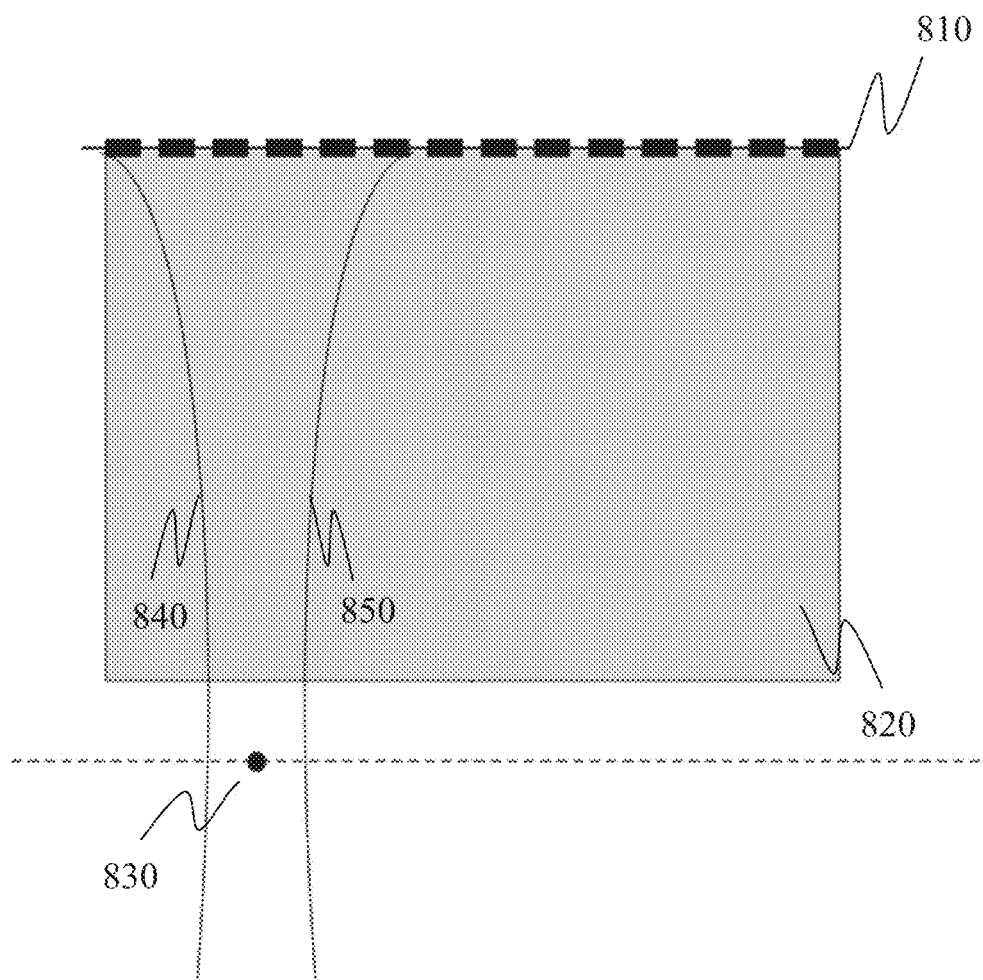
FIG. 8 illustrates an exemplary far-field virtual focus of the linear array detector according to some embodiments of the present disclosure.

A linear array detector of the scanner 110 is provided as an example. FIG. 8 illustrates an exemplary far-field virtual focus of the linear array detector according to some embodiments of the present disclosure. The linear array detector may include a plurality of detecting members (represented by short lines in bold in the figure). The plurality of detecting members of the linear array detector may be arranged in a plane 810. As shown in FIG. 8, a rectangular shadow region 820 may represent an imaging region of the linear array detector. A far-field virtual focus 830 of the linear array detector may be outside the shadow region 820. A scanning range represented by two curves 840 and 850 each representing a boundary of the scanning range of a transmission corresponding to a far-field virtual focus may be illustrated in FIG. 8.

In some embodiments, during a scanning process of the subject, the scanner 110 may scan the subject through the plurality of transmissions of ultrasound waves from the detector of the scanner 110 under one or more far-field virtual focuses. Each of the plurality of transmissions of ultrasound waves may also be referred to as an ultrasound scan. The plurality of transmissions may be performed sequentially. An interval between each pair of consecutive transmissions may also be referred to as a scanning interval. In some embodiments, the scanning interval may be determined according to one or more parameters including a detection depth, a frame rate, a count or number of the plurality of transmissions, etc. In some embodiments, the scanning interval between each pair of consecutive transmissions may be set by a user, according to default settings of the imaging system 100, etc. In some embodiments, the scanning interval may be a constant.

The ultrasound signals of the elements of the at least one region may be generated based on the plurality of transmissions of ultrasound waves. An image of the subject may be generated based on one or more ultrasound signals corresponding to each of the plurality of transmissions. The image corresponding to a transmission may also be referred to as a primary image. An ultrasound image of the subject may be generated by combining or fusing multiple primary images.

In some embodiments, a count or number of the plurality of transmissions of ultrasound waves performed during the scanning process may be determined according to actual situations. The count or number of the transmissions may affect imaging quality of the subject. The larger the count or number of the transmissions is, the better the imaging quality may be. Merely by way of example, an ultrasound image generated based on ultrasound signals from 20 transmissions may have relatively lower quality, an ultrasound image generated based on ultrasound signals from 30 transmissions may have intermediate quality, and an ultrasound image generated based on ultrasound signals from 50 transmissions may have relatively higher quality.

In some embodiments, the scanning interval may be in a range. A lower limit of the range may be a minimum value of the scanning interval, and an upper limit of the range may be a maximum value of the scanning interval. In some embodiments, the minimum value of the scanning interval may be determined according to a detection depth d. For example, the minimum value of the scanning interval may be determined according to Equation (1):

$$t \geq \frac{2d}{c_{min}}, \tag{1}$$

where c denotes the sound velocity, d denotes the detection depth, and $t_{min}$ denotes the minimum value of the scanning interval. In some embodiments, the maximum value of the scanning interval can be determined according to the frame rate and the count or number of the transmissions. For example, the maximum value of the scanning interval may be determined according to Equation (2):

$$t_{max} = \frac{1}{f*a}, \tag{2}$$

where f denotes the frame rate, a denotes the count or number of the ultrasound scans, and $t_{max}$ denotes the maximum value of the scanning interval. The scanning interval may be determined according to Equation (3):

$$t_{min} \leq t_s \leq t_{max}, \tag{3}$$

where $t_s$ denotes the scanning interval.

In some embodiments, the scanning interval may be determined according to an algorithm related to the imaging system 100. In some embodiments, the scanning interval may relate to a maximum frame rate of the scanner 110. According to a principle that the minimum scanning interval corresponds to the maximum frame rate, the maximum frame rate may be determined according to Equation (4):

$$f = \frac{1}{t_s*a}, t_s = t_{min}. \tag{4}$$

In some embodiments, by setting the far-field virtual focuses, the scanning range of each of the plurality of transmissions may be enlarged, and the count or number of the transmissions and the scanning interval between each pair of consecutive transmissions of the plurality of transmissions may be reduced.

Figure 9:
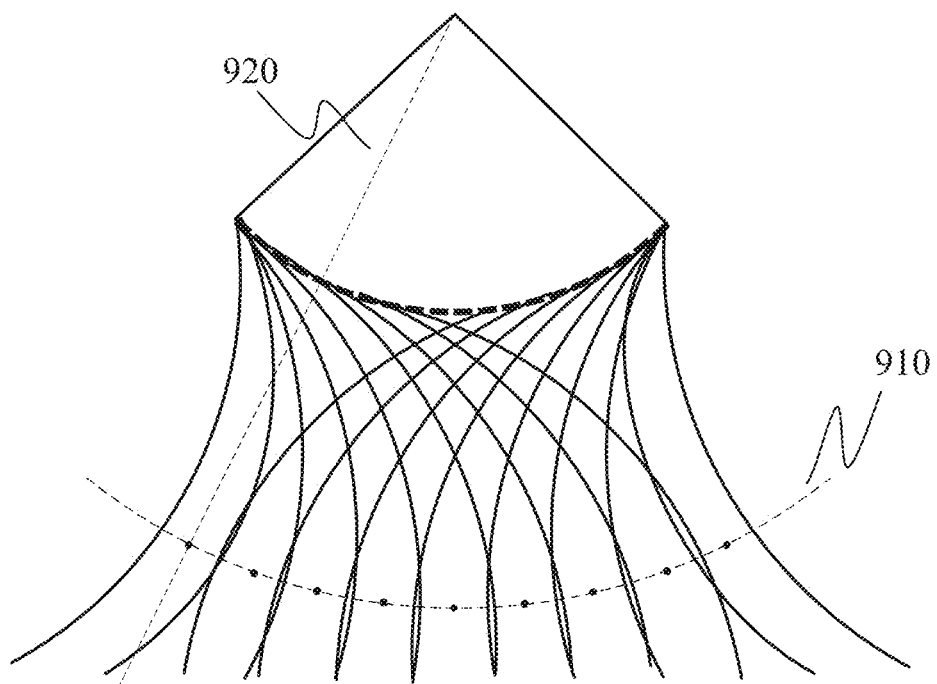
FIG. 9 illustrates exemplary scanning ranges of transmissions of ultrasound waves from a convex array detector according to some embodiments of the present disclosure.

FIG. 9 illustrates exemplary scanning ranges of transmissions of ultrasound waves from a convex array detector according to some embodiments of the present disclosure. The convex array detector may include a plurality of detecting members represented by short lines in bold. The plurality of detecting members may be arranged in a convex with a center O. As shown in FIG. 9, far-field virtual focuses of the plurality of transmissions may be set along a trajectory 910. The far-field virtual focuses (as illustrated as the solid dots on 910) of the plurality of transmissions may distribute on the trajectory 910 evenly. The curves originated from the plurality of detecting members and extending outward toward the trajectory 910 and beyond delineate scanning ranges corresponding to the far-field virtual focuses. The dashed straight line 920 illustrates a centerline of a scanning region corresponding to one of the plurality of transmissions. Scanning ranges of the plurality of transmissions may cover the imaging region of the scanner 110 (not shown in the figure). The count or number of the plurality of transmissions corresponding to the far-field virtual focuses may be about twenty, which may be much lower than a count or number of transmissions corresponding to near-field focuses needed in the scanning process.

Figure 10:
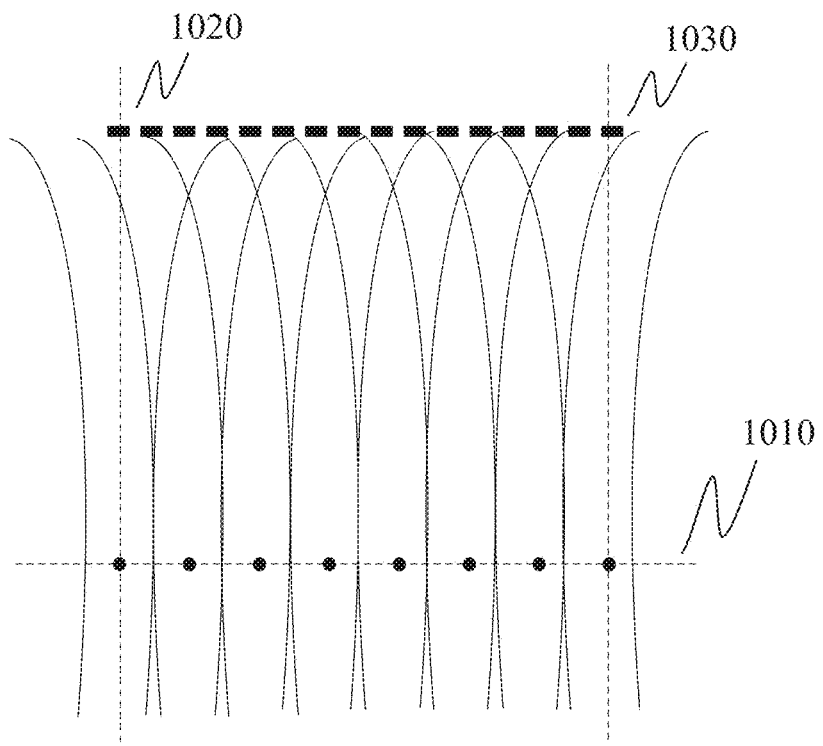
FIG. 10 illustrates exemplary scanning ranges of transmissions of ultrasound waves from a linear array detector according to some embodiments of the present disclosure.

FIG. 10 illustrates exemplary scanning ranges of transmissions of ultrasound waves from a linear array detector according to some embodiments of the present disclosure. The linear array detector may include a plurality of detecting members represented by short lines in bold. As shown in FIG. 10, far-field virtual focuses (as illustrated as the solid dots on 1010) of the plurality of transmissions may be set along a trajectory 1010. The far-field virtual focuses of the plurality of transmissions may distributed on the trajectory 1010 evenly. The curves originated from the plurality of detecting members and extending outward toward the trajectory 1010 and beyond delineate scanning ranges corresponding to the far-field virtual focuses. The dashed straight line 1020 illustrates centerline of a scanning region corresponding to one of the plurality of transmissions. The dashed straight line 1030 illustrates centerline of a scanning region corresponding to another one of the plurality of transmissions. The count or number of the plurality of transmissions corresponding to the far-field virtual focuses may also be much lower than a count or number of transmissions corresponding to near-field focuses needed in the scanning process.

In 520, the processing device 120 (e.g., the beamforming module 430 or the processor 210) may generate a plurality of primary images of the at least one region corresponding to the plurality of transmissions based on the ultrasound signals of the elements of at least one region.

In some embodiments, for a transmission, a primary image may be generated based on an ultrasound signal of each element of the at least one region corresponding to the transmission. In some embodiments, a beamforming operation may be performed on the ultrasound signal of each element of the at least one region corresponding to the transmission. The primary image corresponding to the transmission may be generated based on a result of the beamforming operation performed on each element of the at least one region (also referred to as beamforming result of each element).

Merely for illustration, for the transmission, after the ultrasound signals of elements of the at least one region are obtained, a signal sequence of each element of the at least one region may be determined by demodulating the ultrasound signal of the each element corresponding to the transmission. As used herein, a signal sequence of an element refers to a sequence of discrete data representing the ultrasound signal of the element corresponding to a transmission. The processing device 120 may determine, based on the signal sequence of each element of the at least one region, the beamforming result of the element. In some embodiments, a beamforming result of an element may be designated as a value of the element. In some embodiments, the value of the element may be or include a pixel value or a voxel value of the element.

In some embodiments, target beamforming parameters of an element for the transmission may be determined. The target beamforming parameters of the element refer to parameters for determining the beamforming result of the element. The target beamforming parameters of the element may include at least one of a total count of detecting members of the detector of the scanner 110, delay times regarding the element, angular weights of the element, or a distance weight of the element. The beamforming result of the element (e.g., the value of the element) may be determined based on the signal sequence of the element and the target beamforming parameters of the element corresponding to the transmission. After beamforming results of the elements of the at least one region are determined, the primary image of the at least one region corresponding to the transmission may be generated based on the beamforming results of the elements of the at least one region. More details regarding the generation of the primary image of the at least one region corresponding to the transmission can be found elsewhere in the present disclosure. See, for example, FIGS. 12 and 13, and the descriptions thereof. In this way, the processing device 120 may generate the plurality of primary images of the at least one region corresponding to the plurality of transmissions based on the ultrasound signals of the elements of at least one region. In some embodiments, each of one or more GPUs may be used to determine a primary image of the at least one region corresponding to one of the plurality of transmissions in parallel. The time for determining the ultrasound image of the subject may be greatly reduced, and real-time imaging may be realized.

In 530, the processing device 120 (e.g., the image generation module 440 or the processor 210) may generate an ultrasound image of the subject located in the at least one region based on the plurality of primary images corresponding to the plurality of transmissions.

The plurality of primary images of the at least one region corresponding to the plurality of transmissions may be images of relatively low resolutions. The ultrasound image of the subject located in the at least one region may be generated based on the plurality of primary images corresponding to the plurality of transmissions. For example, the plurality of primary images corresponding to the plurality of transmissions may be combined (using e.g., a coherent composition, an incoherent composition, a weighted composition, etc.) into a combined image. In some embodiments, the combined image may be designated as the ultrasound image of the subject who is positioned in the at least one region during the imaging process including the plurality of transmissions. In some embodiments, the combined image may further be processed. For example, the combined image may be denoised, enhanced, corrected, converted from a coordinate system to another coordinate system, etc. The processed combined image may be designated as the ultrasound image of the subject in the at least one region. The ultrasound image of the subject may be an image with a relatively high resolution.

According to the embodiments set forth above, the processing device 120 may obtain ultrasound signals of elements of at least one region corresponding to a plurality of transmissions of ultrasound waves from a scanner, generate a plurality of primary images of the at least one region corresponding to the plurality of transmissions based on the ultrasound signals of the elements of at least one region, and generate an ultrasound image of the subject located in the at least one region based on the plurality of primary images corresponding to the plurality of transmissions. During this process, the plurality of transmissions of ultrasound waves may correspond to far-field virtual focuses, which are outside the imaging region of the scanner 110. In this way, scanning ranges of the plurality of transmissions may be enlarged, and the count or number of the transmissions and the scanning interval between each pair of consecutive transmissions of the plurality of transmissions may be reduced. In addition, since the far-field virtual focuses are far away from the detecting members of the detector, the intensities of the ultrasound waves received by the detecting members of the detector do not attenuate significantly, and the frame rate of the ultrasound imaging and the quality of the ultrasound image of the subject may be improved.

FIG. 11 is a flowchart illustrating an exemplary process for generate a primary image of at least one region corresponding to a transmission of ultrasound waves according to some embodiments of the present disclosure. In some embodiments, the process 1100 may be executed by the imaging system 100. For example, the process 1100 may be implemented as a set of instructions (e.g., an application) stored in a storage device (e.g., the storage device 130). The modules described in FIG. 4 and/or the processor 210 may execute the set of instructions and may accordingly be directed to perform the process 1100. The operations of the illustrated process presented below are intended to be illustrative. In some embodiments, the process 1100 may be accomplished with one or more additional operations not described and/or without one or more of the operations discussed. Additionally, the order of the operations of process 1100 illustrated in FIG. 11 and described below is not intended to be limiting.

In 1110, the processing device 120 (e.g., the beamforming module 430 or the processor 210) may determine a signal sequence of each element of the at least one region by demodulating an ultrasound signal of the element corresponding to the transmission.

As for the transmission, ultrasound waves generated by the detector of the scanner 110 may be used as a medium for obtaining information of the at least one region. The ultrasound signals obtained by the processing device 120 may be generated based on ultrasound waves received by the detector. In some embodiments, the ultrasound signals may be modulated signals including the information of the at least one region. After the ultrasound signals of the elements of the at least one region corresponding to the transmission are obtained, the information of the at least one region may be obtained by demodulating the ultrasound signals of the elements. The ultrasound signals may be demodulated using a Hilbert transform, a sine transform, etc. In some embodiments, a demodulated ultrasound signal of each element may include a signal sequence of the element.

In 1120, the processing device 120 (e.g., the beamforming module 430 or the processor 210) may determine, based on the signal sequence of the element, a value of each element of the at least one region corresponding to the transmission.

After signal sequences of the elements of the at least one region are determined, a beamforming operation may be performed on the signal sequence of each element of the at least one region. In some embodiments, target beamforming parameters for each element may be obtained. The processing device 120 may determine a beamforming result (e.g., a value) of each element based on the signal sequence of the element, the target beamforming parameters of the element, and/or one or more beamforming functions. Merely by way of example, for an element, the processing device 120 may determine a pixel value of the element based on a signal sequence of the element, target beamforming parameters of the element, and the one or more beamforming functions. In some embodiments, coordinates of the plurality of elements may be determined with respect to a first coordinate system (e.g., the coordinate system 170). The target beamforming parameters for each of the plurality of elements may be determined based on coordinates of the element. More details regarding the determination of the value of each element of the at least one region corresponding to a transmission can be found elsewhere in the present disclosure. See, for example, FIG. 12 and the descriptions thereof.

In 1130, the processing device 120 (e.g., the image generation module 440 or the processor 210) may generate a primary image of the at least one region based on the value of each element of the at least one region.

After the values of the elements of the at least one region are determined, the primary image of the at least one region may be generated based on the values of the elements of the at least one region. The primary image of the at least one region corresponding to the transmission may be an image with relatively low resolution.

According to the embodiments set forth above, for each of the plurality of transmissions, the beamforming result of each element of the at least one region may be obtained. All the elements may constitute the at least one region. The beamforming may be associated with the at least one region instead of conventional scanning lines. Effective utilization of ultrasound signals corresponding to each of the plurality of transmissions may bring about more accurate beamforming results of the elements of the at least one region in comparison with beamforming result of conventional scanning lines, which may lead to a wasting of information from elements out of the conventional scanning lines.

Figure 12:
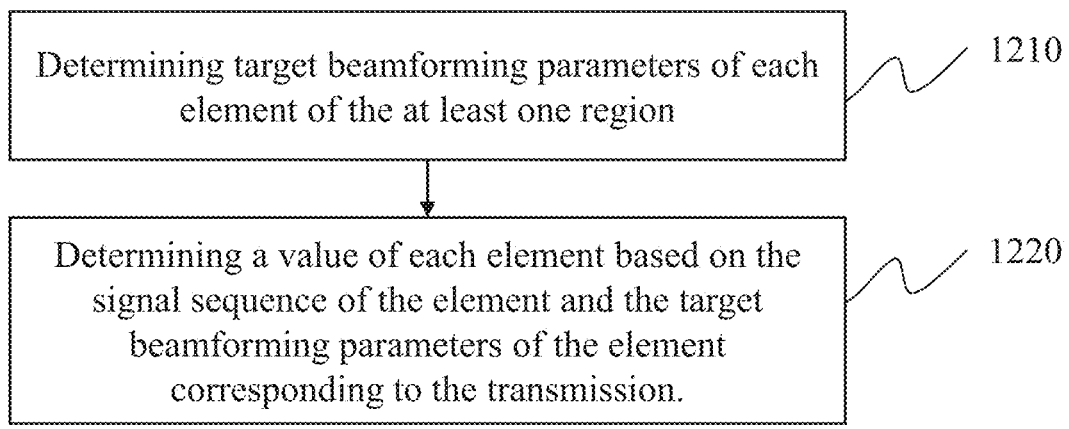
FIG. 12 is a flowchart illustrating an exemplary process for determining a value of each element of the at least one region corresponding to a transmission according to some embodiments of the present disclosure.

FIG. 12 is a flowchart illustrating an exemplary process for determining a value of each element of the at least one region corresponding to a transmission according to some embodiments of the present disclosure. In some embodiments, the process 1200 may be executed by the imaging system 100. For example, the process 1200 may be implemented as a set of instructions (e.g., an application) stored in a storage device (e.g., the storage device 130). The modules described in FIG. 4 and/or the processor 210 may execute the set of instructions and may accordingly be directed to perform the process 1200. The operations of the illustrated process presented below are intended to be illustrative. In some embodiments, the process 1200 may be accomplished with one or more additional operations not described and/or without one or more of the operations discussed. Additionally, the order of the operations of process 1200 illustrated in FIG. 12 and described below is not intended to be limiting.

In 1210, the processing device 120 (e.g., the beamforming module 430 or the processor 210) may determine target beamforming parameters of each element of the at least one region.

In some embodiments, the processing device 120 may obtain a type of a detector of the scanner 110. The type of the detector of the scanner 110 may include a convex array detector, a linear array detector, etc. In some embodiments, the processing device 120 may obtain the type of the detector from a user (e.g., a doctor, a technician, etc.). For example, the user may input the type of the detector through the terminal device 140. In some embodiments, the processing device 120 may obtain the type of the detector from one or more components of the imaging system 100. For example, information of the detector (e.g., a serial number, a model number, operating parameters, performance parameters, etc.) may be stored in a storage unit associated with the detector. When the detector is connected to the scanner 110, the processing device 120 may obtain the information of the detector from the storage unit, and identify the type of the detector based on the obtained information of the detector.

In some embodiments, detectors of different types may correspond to different first coordinate systems. For example, a position of an origin of a first coordinate system corresponding to a convex array detector may be different from a position of an origin of another first coordinate system corresponding to a linear array detector. Coordinates of the elements may be determined with respect to different first coordinate systems corresponding to detectors of different types. The coordinates of the elements corresponding to detectors of different types may be different. Multiple sets of beamforming parameters of an element may be determined based on different coordinates of the element. Each of the multiple sets of beamforming parameters of the element may include at least one of a total count of detecting members of the corresponding detector, delay times regarding the element, angular weights of the element, or a distance weight of the element.

In some embodiments, the multiple sets of beamforming parameters of an element corresponding to detectors of different types may be stored in a mapping table. The mapping table may include correspondence relationships between beamforming parameters of elements of the at least one region and a plurality of types of the detector. The processing device 120 may identify the target beamforming parameters of each element of the at least one region from the mapping table according to the type of the detector. In some embodiments, the mapping table may be pre-established so as to reduce the computation load of the processing device 120 during the imaging process, and improve the efficiency of the imaging process.

In 1220, the processing device 120 (e.g., the beamforming module 430 or the processor 210) may determine the value of each element based on the signal sequence of the element and the target beamforming parameters of the element corresponding to the transmission.

In some embodiments, the value (e.g., pixel value) of each element may be determined based on the signal sequence of the element, at least one of the target beamforming parameters of the element, and/or one or more beamforming functions. Assuming that a size of the ultrasound image of the subject is M×N pixels, for an element T with coordinates (m, n), the value of each element may be determined according to Equation (5):

$$\text{pix}(T) = \omega_d(T) \Sigma_{i=0}^{E} \omega_a(T,i) S_i(Td_i), \quad (5)$$

where pix(T) denotes a pixel value of the element T, $\omega_d(T)$ denotes a distance weight of the element T, $\omega_a(T, i)$ denotes angle weights of the element T with respect to an i-th detecting member of the detector, $S_i$ denotes an ultrasound signal received by the i-th detecting member, $Td_i$ denotes a delay time regarding the element to an i-th detecting member of the detector, and E denotes a total count or number of detecting members of the detector. The parameters E and i may be natural numbers.

In some embodiments, the delay times regarding the element may be determined based on coordinates of each of the detecting members of the detector, coordinates of the element, and the sound velocity. Merely by way of example, the delay times may be determined according to Equation (6):

$$Td_i = \frac{td + rd_i}{c}, \quad (6)$$

where td denotes a transmitting distance from a detecting member on a main direction of the ultrasound waves of the transmission to the element T, $rd_i$ denotes a receiving distance from the element T to the detecting member i. In some embodiments, the transmitting distance may be determined according to Equation (7):

$$td = id + sn \ast \Delta d, \quad (7)$$

where id denotes an initial distance from the detecting member on the main direction of the ultrasound waves to a reference element, $\Delta d$ denotes a distance between a pair of consecutive elements, and sn denotes a serial number of the element T $\Delta d$ may be a constant, and n may be a natural number. In some embodiments, the receiving distance may be determined according to Equations (8)-(10):

$$rd_i = \sqrt{(T_x - e_{ix})^2 + (T_y - e_{iy})^2}, \quad (8)$$

$$T_x = \sin(\varphi(\frac{2m}{M} - 1))(R + td), \quad (9)$$

$$T_y = \cos(\varphi\left(\frac{2m}{M} - 1\right))(R + td) - R, \quad (10)$$

where $(T_x, T_y)$ denotes coordinates of the element T, $(e_{ix}, e_{iy})$ denotes coordinates of the i-th detecting member, φ denotes a half-angle of the detector, and R denotes a radius of the detector (as for a linear array detector, R may be infinite).

Figure 13:
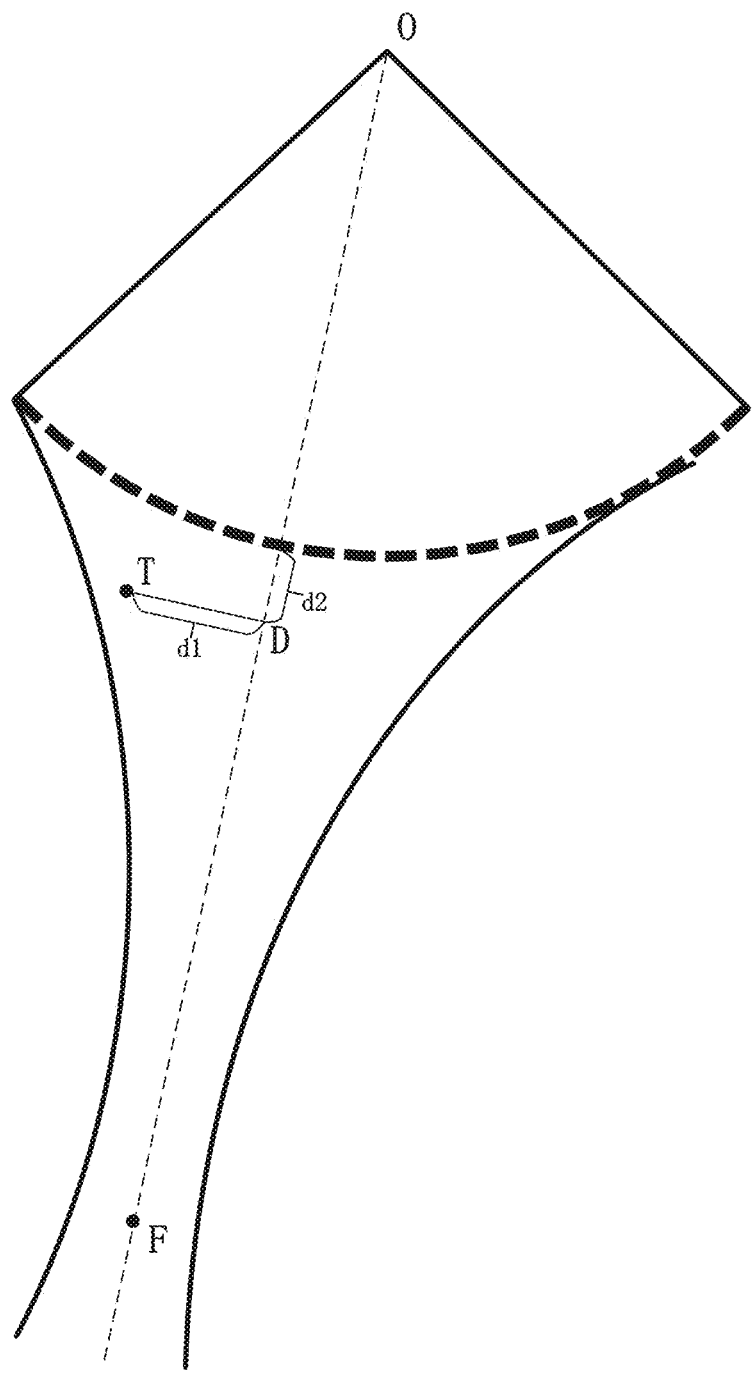
FIG. 13 illustrates a schematic diagram for determining the distance weight of the element for a convex array detector according to some embodiments of the present disclosure.

As for the transmission, elements at different locations may correspond to ultrasound waves of different energy values, thus resulting in different contributions to the ultrasound signals. In this case, elements at different locations may have different contributions to the quality of the primary image corresponding to the transmission. In some embodiments, the distance weight of the element may be determined based on coordinates of the element T and coordinates of a far-field virtual focus corresponding to the transmission. FIG. 13 illustrates a schematic diagram for determining the distance weight of the element for a convex array detector according to some embodiments of the present disclosure. As show in FIG. 13, a straight line OF connecting a far-field virtual focus F and a center point O of the detector may be a main direction along which the ultrasound waves propagate. A scanning range of the ultrasound waves may be symmetrical about the straight line OF. As a depth that the ultrasound waves propagate towards the far-field virtual focus F, the ultrasound waves may focus gradually. The energy of the ultrasound waves in the main direction may be higher than the energy of the ultrasound waves in other directions. The closer an element is to the main direction, the higher the energy of the ultrasound waves, and the greater the weight may be. Besides, as the depth that the ultrasound waves propagate increases, a width of the scanning range of the ultrasound waves may decrease. Merely by way of example, the distance weight of the element T may be determined according to Equation (11):

$$\omega_d(T) = \frac{N}{d_1 \ast d_2}, \quad (11)$$

where N denotes a parameter for adjusting the distance weight of the element, $d_1$ denotes a distance from the element T to the main direction OF, $d_2$ denotes a depth of an intersection between the main direction OF and a vertical line of the main direction OF that passes through the element T.

Assuming that coordinates of the center point of the detector is $O(O_x, 0_y)$, and coordinates of the far-field virtual focus is $F(F_x, F_y)$, $d_1$ may be determined according to Equations (12)-(15):

$$d_1 = \frac{|AT_x + BT_y + C|}{\sqrt{A^2 + B^2}}, \quad (12)$$

-continued $$A = F_y - O_y, \quad (13)$$

$$B = O_x - F_x, \quad (14)$$

$$C = F_x \cdot O_y - O_x \cdot F_y, \quad (15)$$

and $d_2$ may be determined according to Equations (16)-(18):

$$d_2 = OD - R = \sqrt{(D_x - O_x)^2 + (D_y - O_y)^2} - R, \quad (16)$$

$$D_x = \frac{B^2 T_x - ABT_y - AC}{A^2 + B^2}, \quad (17)$$

$$D_y = \frac{A^2 T_y - ABT_X - BC}{A^2 + B^2}. \quad (18)$$

Figure 14:
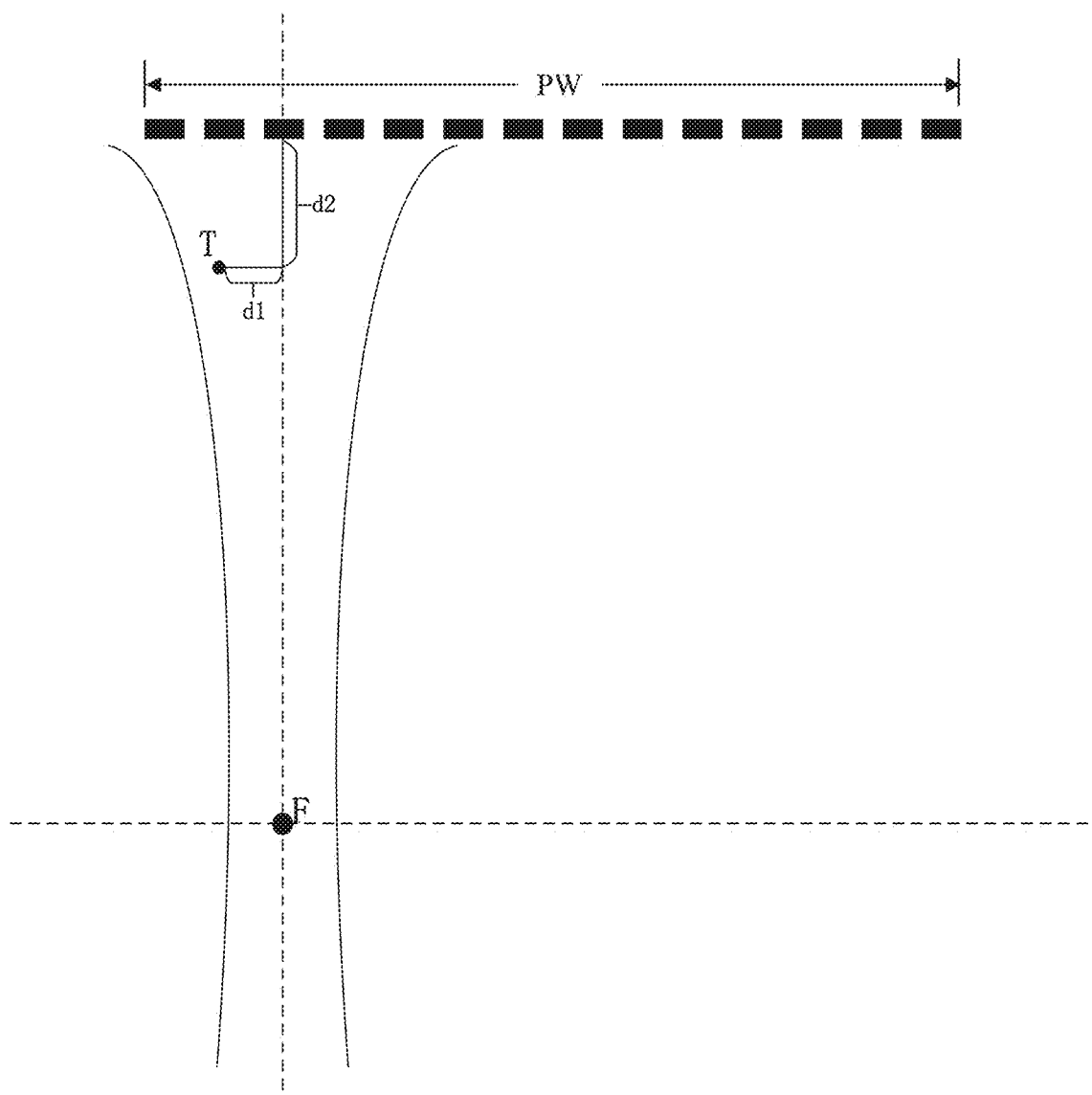
FIG. 14 illustrates a schematic diagram for determining the distance weight of the element for a linear array detector according to some embodiments of the present disclosure.

FIG. 14 illustrates a schematic diagram for determining the distance weight of the element for a linear array detector according to some embodiments of the present disclosure. Merely by way of example, the distance weight of the element T may be determined according to Equations (19)-(23):

$$\omega_d(T) = \frac{N}{d_3 * d_4}, \quad (19)$$

$$d_3 = T_y, \quad (20)$$

$$d_4 = |T_x - F_x|, \quad (21)$$

$$T_x = \left(\frac{m}{M} - \frac{1}{2}\right) PW, \quad (22)$$

$$T_y = td, \quad (23)$$

where $(T_x, T_y)$ denotes coordinates of the element T, PW denotes a width of the linear array detector.

As for the transmission, ultrasound waves reflected by the element T may propagate to any direction around the element T. Assuming that a detecting member Ei receives the ultrasound waves reflected by the element T, if a direction from the element T to the detecting member Ei is perpendicular to the detecting member Ei (i.e., a first angle between a normal direction of the detecting member Ei and the direction from the element T to the detecting member Ei equals to 0), an intensity of an ultrasound signal received by the detecting member Ei may be larger than intensities of ultrasound signals received by other detecting members. The larger the first angle is, the smaller the intensity of the ultrasound signal received by the detecting member Ei may be. In some embodiments, the angular weights of the element may be determined based on a plurality of angles. In some embodiments, each of the plurality of angles may associated with a detecting member. An angle associated with a detecting member may be an intersection angle between a normal direction of the detecting member and a target direction from the element T to the detecting member.

Figure 15:
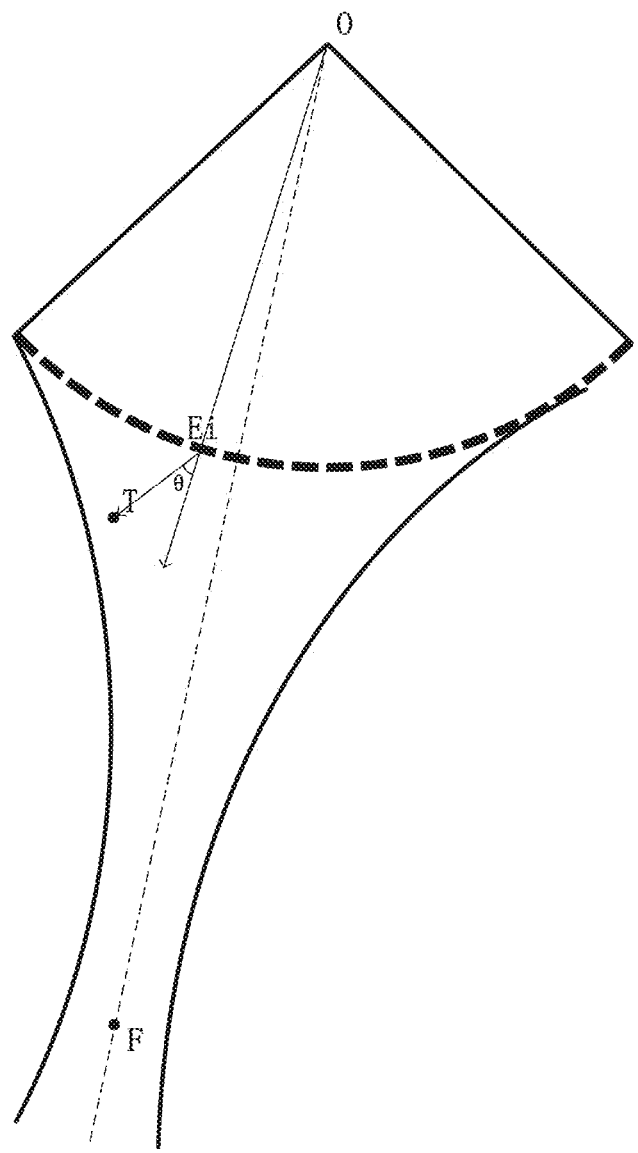
FIGS. 15 and 16 illustrate schematic diagram for determining the angular weights of the element for a convex array detector and a linear array detector, respectively, according to some embodiments of the present disclosure.
Figure 16:
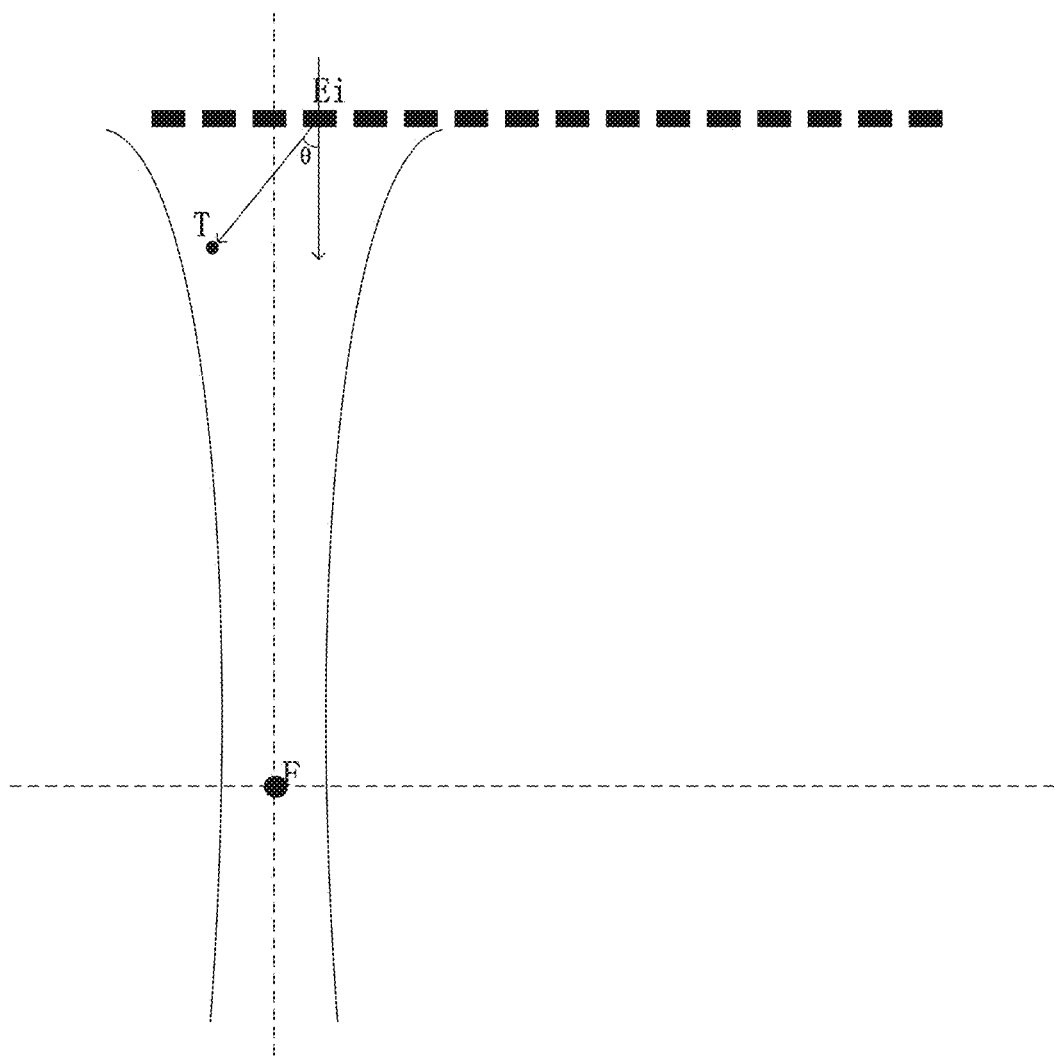

In some embodiments, an angle associated with a detecting member may be smaller than a maximum directivity angle $\hat{\theta}$ of the detecting member. In some embodiments, the maximum directivity angle $\hat{\theta}$ of each of the plurality of detecting members may be the same. If the first angle is larger than the maximum directivity angle $\hat{\theta}$ of the detecting member, the detecting member may not receive ultrasound waves from the element T. FIGS. 15 and 16 illustrate schematic diagram for determining the angular weights of the element for a convex array detector and a linear array detector, respectively, according to some embodiments of the present disclosure. In combination with FIGS. 15 and 16, the angular weights of the element regarding the convex array detector may be determined according to Equation (24):

$$\omega_a(T, i) = 1 - \left(\frac{\sin \theta_i}{\sin \hat{\theta}}\right)^2. \quad (24)$$

where $\theta_i$ denotes an angle associated with a detecting member Ei.

In some embodiments, for each element of the at least one region, coordinates of detecting members, coordinates of far-field virtual focuses corresponding to the plurality of transmissions, and/or coordinates of the element corresponding to detectors of various types may be determined. Delay times of the elements corresponding to detectors of various types may be determined based on the coordinates of the detecting members, coordinates of the far-field virtual focuses corresponding to the plurality of transmissions, and/or coordinates of the elements. In some embodiments, for each element of the at least one region, transmitting distances and receiving distances of each detecting member corresponding to detectors of various types may be determined. Distance weights and angular weights of the element of the at least one region corresponding to detectors of various types may be determined. In some embodiments, the delay times, distance weights and/or angular weights of the elements of the at least one region and corresponding types of detectors may be stored in the mapping table. When the processing device 120 determines target beamforming parameters of an element corresponding to a specific type of detector, the delay times, the distance weight, and/or angular weights of the element may be identified and retrieved from the mapping table according to the specific type of the detector. In some embodiments, the mapping table may be pre-established so as to reduce the computation load of the processing device 120 during the imaging process, and improve the efficiency of the imaging process.

FIG. 17 is a flowchart illustrating an exemplary process for optimizing a signal sequence of each element of the at least one region according to some embodiments of the present disclosure. In some embodiments, the process 1700 may be executed by the imaging system 100. For example, the process 1700 may be implemented as a set of instructions (e.g., an application) stored in a storage device (e.g., the storage device 130). The modules described in FIG. 4 and/or the processor 210 may execute the set of instructions and may accordingly be directed to perform the process 1700. The operations of the illustrated process presented below are intended to be illustrative. In some embodiments, the process 1700 may be accomplished with one or more additional operations not described and/or without one or more of the operations discussed. Additionally, the order of the operations of process 1700 illustrated in FIG. 17 and described below is not intended to be limiting.

In 1710, the processing device 120 (e.g., the beamforming module 430 or the processor 210) may optimize a signal sequence of each element of at least one region by performing an interpolation on the signal sequence based on an interpolation approach and delay times of the element.

In some embodiments, a signal sequence of an element may be a sequence of discrete data representing the ultrasound signal of the element. If a signal value $S_i(T_{delay})$ corresponding to a delay time $T_{delay}$ of the element is between a pair of consecutive signal values $S_i(T_N)$ and $S_i(T_{N+1})$ (e.g., N is an integer), an interpolation operation may be performed on the signal sequence. Exemplary interpolation approaches may include a nearest neighbor interpolation, a linear interpolation, a quadratic interpolation, a cubic interpolation, a Lagrange interpolation, etc. In some embodiments, a modification on the exemplified interpolations may be performed. In some embodiments, the modification may relate to one or more parameters (e.g., an amplitude, a phase, a frequency, etc.) of the ultrasound signal of at least one element. Merely by way of example, a modification related to an amplitude, a phase, and/or a frequency of the ultrasound signal of the at least one element may be performed the Lagrange interpolation. For each element, an optimized signal sequence (also referred to as interpolated signal sequence) of the element may be determined by performing an interpolation on the signal sequence based on the modified interpolation approach (e.g., modified Lagrange interpolation) and the delay times of the element. The modified interpolation may improve the accuracy of the interpolation operation, reduce noise introduced into the signal sequence in the interpolation, and improve the quality of the ultrasound image of the subject.

In 1720, the processing device 120 (e.g., the beamforming module 430 or the processor 210) may determine the value of each element based on the optimized signal sequence of the element and the target beamforming parameters of the element corresponding to the transmission.

In some embodiments, the value (e.g., pixel value) of each element may be determined based on the optimized signal sequence of the element, at least one of the target beamforming parameters of the element, and/or one or more beamforming functions.

Figure 18A:
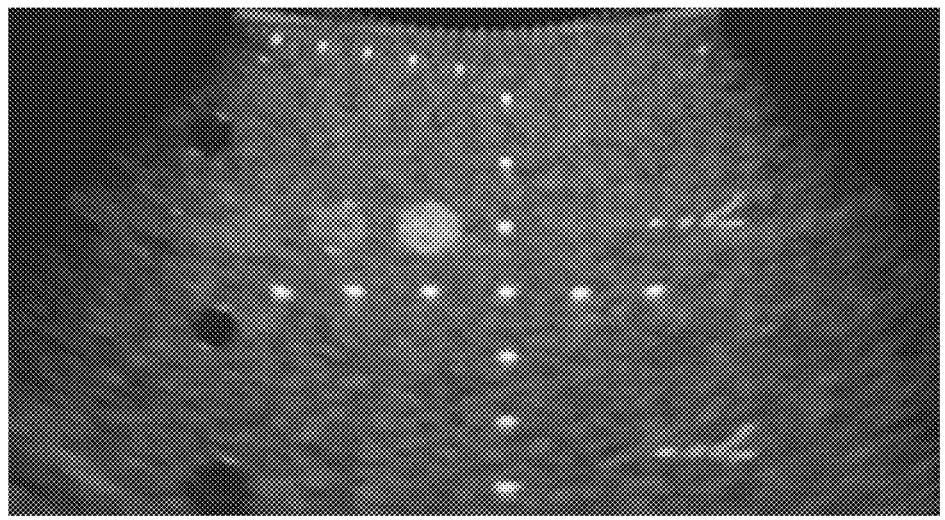
FIG. 18A illustrates a first ultrasound image of a subject generated based on signal sequences of the elements of the at least one region optimized using the modified Lagrangian interpolation.
Figure 18B:
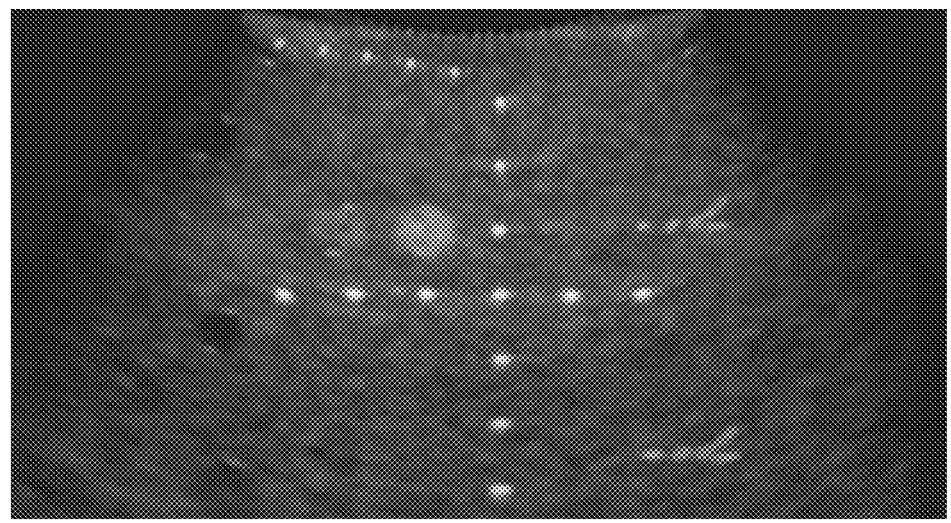
FIG. 18B illustrates a second ultrasound image of the subject generated based on signal sequences of the elements of the at least one region optimized using the conventional Lagrangian interpolation.

FIG. 18A illustrates a first ultrasound image of a subject generated based on signal sequences of the elements of the at least one region optimized using the modified Lagrangian interpolation. The modification to the Lagrangian interpolation may relate to one or more parameters (e.g., an amplitude, a phase, a frequency, etc.) of the ultrasound signal of at least one element. FIG. 18B illustrates a second ultrasound image of the subject generated based on signal sequences of the elements of the at least one region optimized using the conventional Lagrangian interpolation. As shown in FIGS. 18A and 18B, the quality of the first ultrasound image is better than the second ultrasound image.

FIG. 19 is a flowchart illustrating an exemplary process for generating an ultrasound image of a subject according to some embodiments of the present disclosure. In some embodiments, the process 1900 may be executed by the imaging system 100. For example, the process 1900 may be implemented as a set of instructions (e.g., an application) stored in a storage device (e.g., the storage device 130). The modules described in FIG. 4 and/or the processor 210 may execute the set of instructions and may accordingly be directed to perform the process 1900. The operations of the illustrated process presented below are intended to be illustrative. In some embodiments, the process 1900 may be accomplished with one or more additional operations not described and/or without one or more of the operations discussed. Additionally, the order of the operations of process 1900 illustrated in FIG. 19 and described below is not intended to be limiting.

In 1910, the processing device 120 (e.g., the image generation module 440 or the processor 210) may generate a secondary image of the subject in the at least one region by combining the plurality of primary images corresponding to the plurality of transmissions.

After the plurality of primary images corresponding to the plurality of transmissions are obtained, the plurality of primary images may be combined (using e.g., a coherent composition, an incoherent composition, a weighted composition, etc.) into a combined image. In some embodiments, the combined image may be designated as a secondary image of the subject in the at least one region if the detector of the scanner 110 is a convex array detector.

In 1920, the processing device 120 (e.g., the image generation module 440 or the processor 210) may determine coordinates of pixels in the secondary image with respect to a first coordinate system. In some embodiments, the first coordinate system may be an orthogonal coordinate system. In some embodiments, an origin of the first coordinate system may be located at a mid-point of a tangent line segment of at least one central detecting member of the detecting members of the detector. In some embodiments, the count or number of the plurality of detecting members of the convex array detector may be an even number. The at least one central detecting member may include two detecting members in the middle portion of the convex array detector. For example, if the convex array detector includes 128 detecting members $E_0$-$E_{127}$, the at least one central detecting member may be $E_{63}$ and $E_{64}$. The mid-point of a tangent line segment of the at least one central detecting member may be a mid-point of the tangent line segment of $E_{63}$ and $E_{64}$.

Axes of the first coordinate system may be perpendicular to each other. In some embodiments, a horizontal axis of the first coordinate system may be an outer tangent line of the detecting members of the convex array detector. A vertical axis of the first coordinate system may pass through the origin of the first coordinate system and be perpendicular to the outer tangent line.

In 1930, the processing device 120 (e.g., the image generation module 440 or the processor 210) may generate an ultrasonic image of the subject in the at least one region by performing a coordinate conversion on the pixels in the secondary image according to a relationship between the first coordinate system and a second coordinate system.

In some embodiments, the second coordinate system may be an orthogonal coordinate system, a polar coordinate system, a spherical coordinate system, a cylindrical coordinate system, etc. In some embodiments, the second coordinate system may be designated by a user, according to default settings of the imaging system 100, etc.

In some embodiments, the second coordinate system may also be an orthogonal coordinate system. An origin of the second coordinate system is located at a center of the convex array detector (e.g., the point O of the convex array detector as illustrated in FIGS. 13 and 15). A horizontal axis of the second coordinate system may be a horizontal line passing through the origin of the second coordinate system. A vertical axis of the second coordinate system may pass through the origin of the second coordinate system and be perpendicular to the horizontal axis of the second coordinate system. The processing device 120 may perform a coordinate conversion on the pixels in the secondary image according to a relationship between the first coordinate system and the second coordinate system. The converted secondary image may be designated as the ultrasound image of the subject. The ultrasound image generated by performing the coordinate conversion may be more intuitive for display on the screen 160 of the terminal device 140. In addition, the coordinate conversion performed on the secondary image may not increase the data volume significantly, thus reducing the computation load of the imaging process of the subject.

Figure 20:
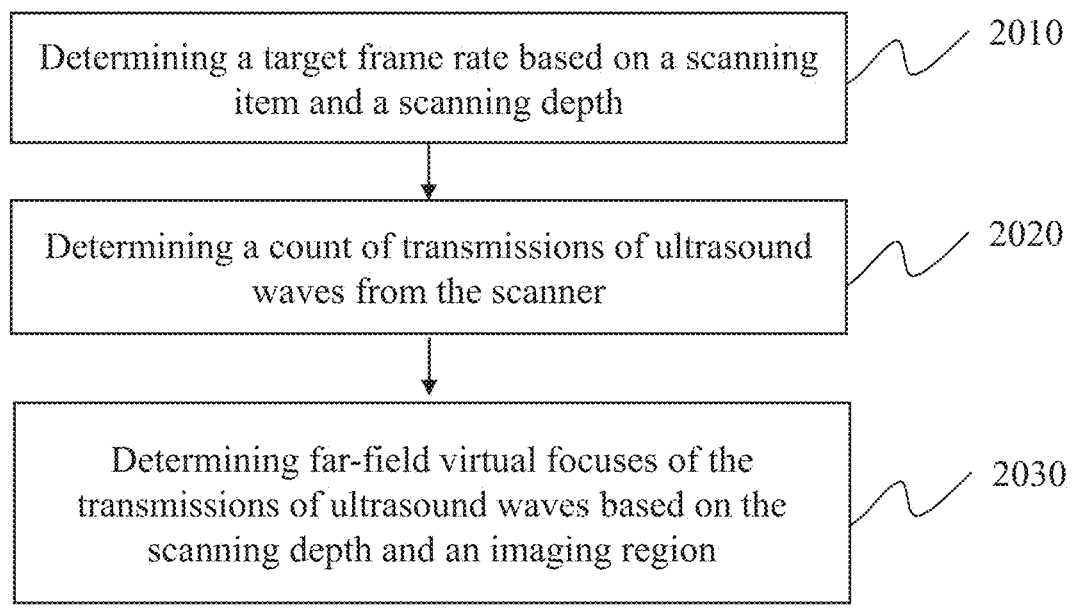
FIG. 20 is a flowchart illustrating an exemplary process for determining a scanning protocol for scanning a subject according to some embodiments of the present disclosure.

FIG. 20 is a flowchart illustrating an exemplary process for determining a scanning protocol for scanning a subject according to some embodiments of the present disclosure. In some embodiments, the process 2000 may be executed by the imaging system 100. For example, the process 2000 may be implemented as a set of instructions (e.g., an application) stored in a storage device (e.g., the storage device 130). The modules described in FIG. 4 and/or the processor 210 may execute the set of instructions and may accordingly be directed to perform the process 2000. The operations of the illustrated process presented below are intended to be illustrative. In some embodiments, the process 2000 may be accomplished with one or more additional operations not described and/or without one or more of the operations discussed. Additionally, the order of the operations of process 2000 illustrated in FIG. 20 and described below is not intended to be limiting.

In 2010, the processing device 120 (e.g., the scanning protocol determination module 420 or the processor 210) may determine a target frame rate based on a scanning item and a scanning depth.

The scanning item refers to an item to be executed during the scanning process of the subject. Exemplary scanning items may include an abdominal ultrasound scanning, a cardiac color ultrasound scanning, a vascular color ultrasound scanning, a skeletal and muscular scanning, etc. The scanning depth may be a depth associated with the scanning item under a reference surface (e.g., the skin of the subject). In some embodiments, the scanning depth may be determined according to the scanning item and a location of a lesion of the subject.

In some embodiments, the target frame rate of the scanner 110 may be determined based on the scanning item and the scanning depth. In some embodiments, a maximum frame rate may be obtained. A specific frame rate smaller than the maximum frame rate may be determined as the target frame rate. The specific frame rate may be in conformity with the scanning item and the scanning depth. The specific frame rate may be designated as the target frame rate. In some embodiments, an optimal frame rate may be determined based on the scanning item, the scanning depth, and operating parameters of the scanner 110, and/or a frame rate determination algorithm. The optimal frame rate may be designated as the target frame rate. Merely by way of example, the target frame rate may be, for example, 30 frames per second (FPS), 60 FPS, 100 FPS, 120 FPS, etc.

In 2020, the processing device 120 (e.g., the scanning protocol determination module 420 or the processor 210) may determine a count of transmissions of ultrasound waves from the scanner.

After the target frame rate is determined, the count of transmissions of ultrasound waves may be determined based on the target frame rate. Each of the transmissions of ultrasound waves may also be referred to as an ultrasound scan.

In 2030, the processing device 120 (e.g., the scanning protocol determination module 420 or the processor 210) may determine far-field virtual focuses of the transmissions of ultrasound waves based on the scanning depth and an imaging region.

The imaging region refers to a region to be imaged. After operation parameters of the scanner 110 are determined, the imaging region may be determined. In some embodiments, each of the transmissions of ultrasound waves may correspond to a far-field virtual focus. The far-field virtual focuses may be determined based on the imaging region and scanning depth. The far-field virtual focuses may be outside the imaging region. In some embodiments, a start point and an end point of a trajectory of the far-field virtual focuses may be on two boundaries of the imaging region.

Figure 21:
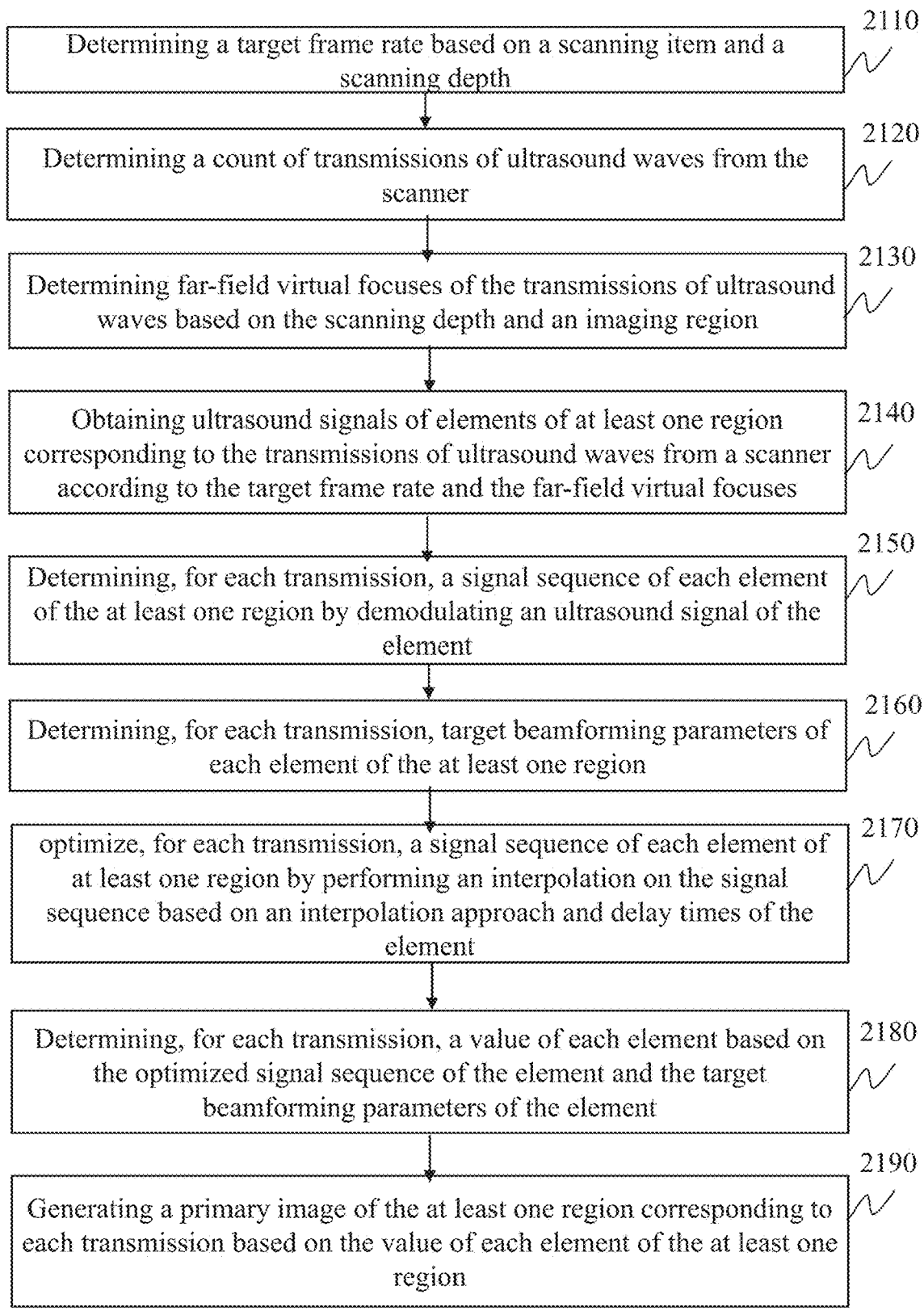
FIG. 21 is a flowchart illustrating an exemplary process for generating an ultrasound image of a subject according to some embodiments of the present disclosure.

FIG. 21 is a flowchart illustrating an exemplary process for generating an ultrasound image of a subject according to some embodiments of the present disclosure. In some embodiments, the process 2100 may be executed by the imaging system 100. For example, the process 2100 may be implemented as a set of instructions (e.g., an application) stored in a storage device (e.g., the storage device 130). The modules described in FIG. 4 and/or the processor 210 may execute the set of instructions and may accordingly be directed to perform the process 2100. The operations of the illustrated process presented below are intended to be illustrative. In some embodiments, the process 2100 may be accomplished with one or more additional operations not described and/or without one or more of the operations discussed. Additionally, the order of the operations of process 2100 illustrated in FIG. 21 and described below is not intended to be limiting.

In 2110, the processing device 120 (e.g., the scanning protocol determination module 420 or the processor 210) may determine a target frame rate based on a scanning item and a scanning depth.

In 2120, the processing device 120 (e.g., the scanning protocol determination module 420 or the processor 210) may determine a count of transmissions of ultrasound waves from the scanner.

In 2130, the processing device 120 (e.g., the scanning protocol determination module 420 or the processor 210) may determine far-field virtual focuses of the transmissions of ultrasound waves based on the scanning depth and an imaging region.

In 2140, the processing device 120 (e.g., the obtaining module 410 or the processor 210) may obtain ultrasound signals of elements of at least one region corresponding to the transmissions of ultrasound waves from a scanner according to the target frame rate and the far-field virtual focuses.

In 2150, the processing device 120 (e.g., the beamforming module 430 or the processor 210) may determine, for each transmission, a signal sequence of each element of the at least one region by demodulating an ultrasound signal of the element.

In 2160, the processing device 120 (e.g., the beamforming module 430 or the processor 210) may determine, for each transmission, target beamforming parameters of each element of the at least one region.

In 2170, the processing device 120 (e.g., the beamforming module 430 or the processor 210) may optimize, for each transmission, a signal sequence of each element of at least one region by performing an interpolation on the signal sequence based on an interpolation approach and delay times of the element.

In 2180, the processing device 120 (e.g., the beamforming module 430 or the processor 210) may determine, for each transmission, a value of each element based on the optimized signal sequence of the element and the target beamforming parameters of the element.

In 2190, the processing device 120 (e.g., the image generation module 440 or the processor 210) may generate a primary image of the at least one region corresponding to each transmission based on the value of each element of the at least one region.

Illustratively, a B scan mode may be taken as an example. In a case that the count of the transmissions is set to 25 and the scanning depth may be is 20 centimeters, the frame rate may reach 120 FPS when the solutions described in the above embodiments are applied in the imaging process. Thus, the frame rate may be adjustable in a range 30-120 FPS, which may satisfy specific scanning items, such as a vascular color ultrasound scanning, a pulse wave detection, a cardiac ultrasound scanning, etc., and improve user experiences.

Figure 22:
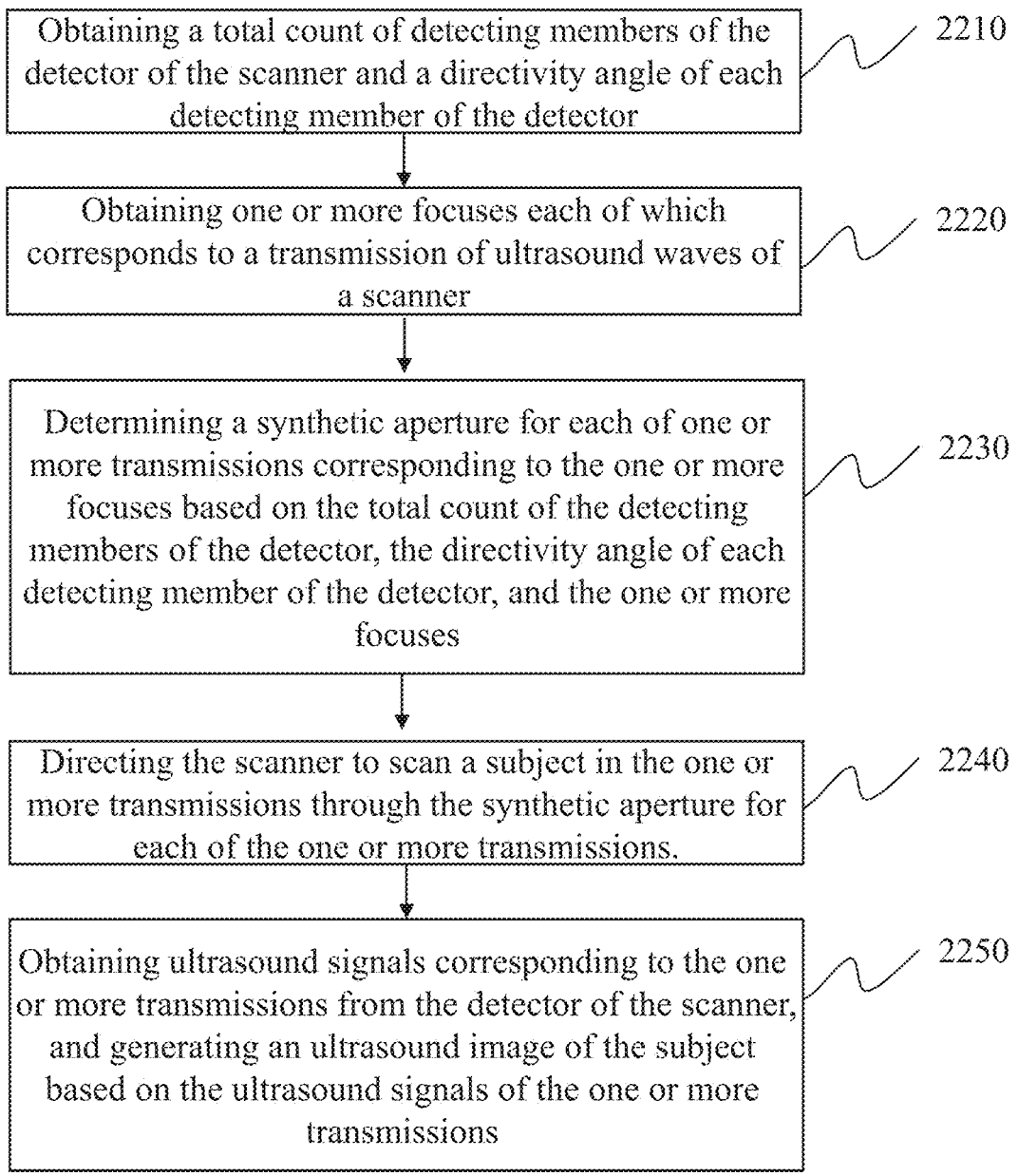
FIG. 22 is a flowchart illustrating an exemplary process for generating an ultrasonic image of a subject according to some embodiments of the present disclosure.

FIG. 22 is a flowchart illustrating an exemplary process for generating an ultrasonic image of a subject according to some embodiments of the present disclosure. In some embodiments, the process 2200 may be executed by the imaging system 100. For example, the process 2200 may be implemented as a set of instructions (e.g., an application) stored in a storage device (e.g., the storage device 130). The modules described in FIG. 4 and/or the processor 210 may execute the set of instructions and may accordingly be directed to perform the process 2200. The operations of the illustrated process presented below are intended to be illustrative. In some embodiments, the process 2200 may be accomplished with one or more additional operations not described and/or without one or more of the operations discussed. Additionally, the order of the operations of process 2200 illustrated in FIG. 22 and described below is not intended to be limiting.

In 2210, the processing device 120 (e.g., the obtaining module 410 or the processor 210) may obtain a total count of detecting members of the detector of the scanner and a directivity angle of each detecting member of the detector.

The detector may be a convex array detector or a linear array detector including a plurality of detecting members. The total count of the plurality of detecting members may relate to a type of the detector. In some embodiments, the processing device 120 may obtain the total count of the plurality of detecting members from a user (e.g., a doctor, a technician, etc.). In some embodiments, the processing device 120 may obtain the total count of the plurality of detecting members from one or more components of the imaging system 100. For example, information of the detector (e.g., the total count of the plurality of detecting members) may be stored in a storage unit of the detector. When the detector is connected to the scanner 110, the processing device 120 may obtain the total count of the plurality of detecting members of the detector from the storage unit of the detector.

The directivity angle of a detecting member refers to a transmitting angle of ultrasound waves generated by the detecting member. The directivity angle may be within a specific angle range so as to avoid the aliasing effect. The directivity angle may be determined according to Equation (25):

$$\sin(|\theta|) \leq \frac{\lambda}{2d}, \quad (25)$$

where θ denotes the directivity angle, λ denotes a wavelength of the ultrasound waves, and d denotes a width of the detecting member.

After the detector of the scanner 110 is determined, the wavelength of ultrasound waves and a width of each detecting member of the detector may be determined. The directivity angle of a detecting member may be determined according to Equation (25).

In 2220, the processing device 120 (e.g., the obtaining module 410 or the processor 210) may obtain one or more focuses each of which corresponds to a transmission of ultrasound waves of a scanner.

In some embodiments, the one or more focuses may be defined by the scanning protocol of the scanner 110. In some embodiments, the one or more focuses may be determined by a user, according to default settings of the imaging system 100, etc. In some embodiments, the focuses described in FIGS. 22-29B may be virtual focuses located within the detector. For example, the one or more focuses corresponding to a convex array detector may be located within a fan-shaped region between a center of the detector and the detecting members. As another example, the one or more focuses corresponding to a linear array detector may be located within a rectangle region between a top end of the detector and the detecting members.

In 2230, the processing device 120 (e.g., the scanning protocol determination module 420 or the processor 210) may determine a synthetic aperture for each of one or more transmissions corresponding to the one or more focuses based on the total count of the detecting members of the detector, the directivity angle of each detecting member of the detector, and the one or more focuses.

In some embodiments, the one or more transmissions of ultrasound waves from the detector may scan the subject positioned in the at least one region. The at least one region may be physical region in the imaging region of the scanner 110. The count or number of the one or more transmissions may be set by the user, according to default settings of the imaging system 100, etc. Merely by way of example, the count or number of the one or more transmissions may be 5, 10, 20, 30, etc. The synthetic aperture refers to an equivalent aperture of the detector including at least one detecting member for transmitting ultrasound waves towards the imaging region. The synthetic aperture may relate to the count (or number) and the positions of detecting members involved in a transmission, and define the detecting members involved in a transmission. The synthetic aperture for each of the one or more transmissions may have a size. In some embodiments, a size of a synthetic aperture may be represented by a count or number of consecutive detecting members included in the synthetic aperture. For example, if the count or number of detecting members included in the synthetic aperture for a transmission is 5, the size of the synthetic aperture for the transmission may be determined as 5.

The size of the synthetic aperture for each of the one or more transmissions corresponding to the one or more focuses may be different among different transmissions. In some embodiments, sizes of at least two synthetic apertures, each corresponding to one of the one or more transmissions may be different. In some embodiments, the size of the synthetic aperture for each of the one or more transmissions may be determined dynamically so as to improve a utilization rate of the plurality of the detecting members of the detector and the quality of the ultrasound image of the subject.

As for each of the one or more transmissions, a size of a corresponding synthetic aperture may be determined. In some embodiments, the synthetic aperture corresponding to each transmission may satisfy one or more conditions (also referred to as constraints). Merely for illustration, the one or more conditions may include a first condition that a size of the synthetic aperture is smaller than the total count of detecting members of the detector.

The detector (e.g., a convex array detector) may have a center (as for a linear array detector, the center of the detector may be considered to be at infinity). For each of the one or more transmissions, an intersection between each of two transmission boundaries of the transmission and a line formed by the detecting members of the detector may be determined. The two transmission boundaries of the transmission may be boundaries of ultrasound waves propagated from a virtual focus corresponding to the transmission. The one or more conditions may also include a second condition that an angle defined by the centerline of the detector and radiuses of the detector passing through the two intersections is smaller than a maximum directivity angle of a detecting member. In some embodiments, the size of the synthetic aperture corresponding to each transmission may be determined according to the one or more conditions. Detailed descriptions regarding to the determination of the size of the synthetic aperture corresponding to each transmission can be found elsewhere in the present disclosure. See, for example, FIG. 28 and the descriptions thereof.

In 2240, the processing device 120 (e.g., the scanning protocol determination module 420 or the processor 210) may direct the scanner to scan a subject in the one or more transmissions through the synthetic aperture for each of the one or more transmissions.

The subject may be scanned in the one or more transmissions of ultrasound waves through corresponding synthetic apertures. As for each of the one or more transmissions, the detector of the scanner 110 may receive ultrasound waves reflected by the subject, and generate ultrasound signals (e.g., ultrasound signals of elements in the at least one region) corresponding to the transmission.

A transmission of ultrasound waves during the scanning of the subject may be taken as an example. One or more detecting members within the synthetic aperture corresponding to the transmission may be activated for transmitting ultrasound waves to the subject positioned in at least one region. The at least one region may be within an imaging region of the scanner 110. The ultrasound waves transmitted to the subject may be reflected back by the subject. The reflected ultrasound waves (also referred to as echo waves) may be received by, for example, all the detecting members of the detector, or a portion thereof. In some embodiments, all the detecting members within the synthetic aperture, instead of all the detecting members within the entire detector, may be activated such that the energy of the ultrasound waves transmitted in a transmission by the detector may be increased or maximized, and the reflected ultrasound waves may remain at a higher energy level, thus improving the accuracy of the scanning process.

In 2250, the processing device 120 (e.g., the image generation module 440 or the processor 210) may obtain ultrasound signals corresponding to the one or more transmissions from the detector of the scanner, and generate an ultrasound image of the subject based on the ultrasound signals of the one or more transmissions.

In some embodiments, after the ultrasound signals corresponding to each of the one or more transmissions are obtained, a beamforming operation may be performed on the ultrasound signals. Merely by way of example, the beamforming operation may be implemented as an analog-to-digital conversion, a signal extraction, a signal analysis, a signal interpolation, etc. A primary image corresponding to each of the one or more transmissions may be generated after the beamforming operation is performed on the ultrasound signals corresponding to the transmission. In some embodiments, the processing device 120 may further perform a post-processing, such as an image compositing operation, a rendering operation, etc., on the digital images corresponding to the one or more transmissions. Then the ultrasound image of the subject may be generated.

According to the embodiments set forth above, the size of the synthetic aperture corresponding to each of the plurality of transmissions may be dynamically determined according to the total count of detecting members of the detector and the maximum directivity angle. In some embodiments, sizes of at least two synthetic apertures, each corresponding to one of the one or more transmissions may be different. In this case, the size of the synthetic aperture corresponding to each of the plurality of transmissions may not need to be adjusted manually each time, thus improving the efficiency of the ultrasound scanning process. In addition, the size of the synthetic aperture for each of the one or more transmissions may be determined dynamically so as to improve the utilization rate of the plurality of the detecting members of the detector and the quality of the ultrasound image of the subject.

In some embodiments, a signal compensation may be performed on the ultrasound signals corresponding to the one or more transmissions. The processing device 120 may generate the ultrasound image of the subject based on the compensated ultrasound signals. In some embodiments, a signal compensation may be performed on one or more ultrasound signals corresponding to a transmission immediately after the one or more ultrasound signals are obtained. In some embodiments, a signal compensation may be performed on a plurality of ultrasound signals corresponding to two or more transmissions after all the plurality of ultrasound signals are obtained. The signal compensation may include a primary signal compensation, a secondary signal compensation, or the like, or a combination thereof. The primary signal compensation (also referred to as primary attenuation compensation) may be an analog signal compensation which is performed on analog signals. The secondary signal compensation (also referred to as secondary attenuation compensation) may be a digital signal compensation which is performed on digital signals. More details regarding the signal compensation can be found elsewhere in the present disclosure. See, for example, FIG. 23 and the descriptions thereof.

After the ultrasound signals corresponding to the one or more transmissions are compensated, the beamforming may be performed on the compensated ultrasound signals. During the beamforming process, operations such as an analog-to-digital conversion, a signal extraction, a signal analysis, a signal interpolation, etc., may be performed on the compensated ultrasound signal. In some embodiments, the beamforming operation herein may be similar to or the same as the beamforming operation described in the process 1100 in FIG. 11 and the process 1200 in FIG. 12. A primary image corresponding to each of the one or more transmissions may be generated after the beamforming operation is performed on the ultrasound signals corresponding to the transmission. In some embodiments, the processing device 120 may further perform a post-processing, such as an image compositing operation, a rendering operation, etc., on the digital images corresponding to the one or more transmissions. Then the ultrasound image of the subject may be generated.

Figure 23:
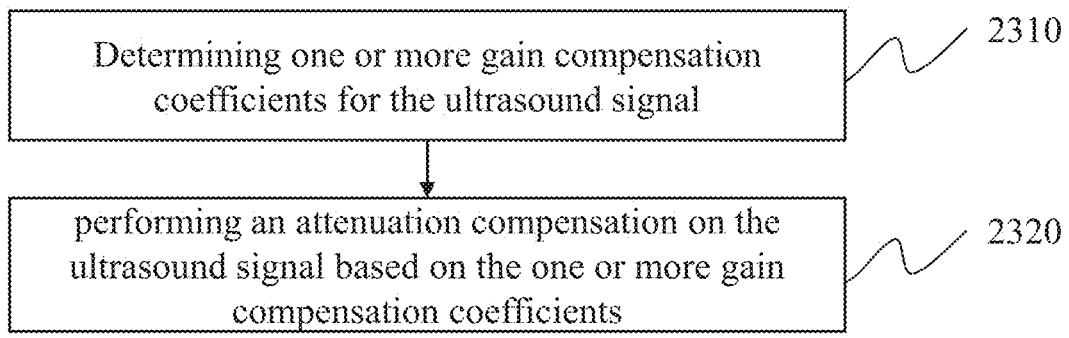
FIG. 23 is a flowchart illustrating an exemplary process for performing a signal compensation on an ultrasound signal according to some embodiments of the present disclosure.

FIG. 23 is a flowchart illustrating an exemplary process for performing a signal compensation on an ultrasound signal according to some embodiments of the present disclosure. In some embodiments, the process 2300 may be executed by the imaging system 100. For example, the process 2300 may be implemented as a set of instructions (e.g., an application) stored in a storage device (e.g., the storage device 130). The modules described in FIG. 4 and/or the processor 210 may execute the set of instructions and may accordingly be directed to perform the process 2300. The operations of the illustrated process presented below are intended to be illustrative. In some embodiments, the process 2300 may be accomplished with one or more additional operations not described and/or without one or more of the operations discussed. Additionally, the order of the operations of process 2300 illustrated in FIG. 23 and described below is not intended to be limiting.

In 2310, the processing device 120 (e.g., the scanning protocol determination module 420 or the processor 210) may determine one or more gain compensation coefficients for the ultrasound signal.

In some embodiments, the processing device 120 may obtain a detection time of the ultrasound signal and a transmitting time of a transmission corresponding to the ultrasound signal (also referred to as transmitting time of the ultrasound signal for brevity). As used herein, a transmitting time of a transmission refers to a time point when ultrasound waves are transmitted from detecting members of a synthetic aperture of the detector corresponding to the transmission. A detection time of an ultrasound signal refers to a time point when the detector detects ultrasound waves corresponding to the ultrasound signal. For each ultrasound signal of the ultrasound signals corresponding to the one or more transmissions, a transmitting time of the ultrasound signal and a detection time of the ultrasound signal may be recorded.

The processing device 120 may determine a time difference regarding the ultrasound signal between a detection time of the ultrasound signal and a transmitting time of the ultrasound signal. After the time difference is determined, one or more gain compensation coefficients may be determined. In some embodiments, the one or more gain compensation coefficients may include a first gain compensation coefficient, a second gain compensation coefficient, etc. In some embodiments, the first gain compensation coefficient may be an analog gain compensation coefficient. The analog gain compensation coefficient refers to a coefficient for compensating attenuation of an analog signal. In some embodiments, the analog gain compensation coefficient for the ultrasound signal may be determined based on the time difference regarding the ultrasound signal.

In some embodiments, the time difference may be compared with a time difference threshold. The time difference threshold may be set by a user, according to default settings of the imaging system 100, etc. If the time difference exceeds the time difference threshold, a value of the analog gain compensation coefficient for the ultrasound signal may be positive. If the time difference is below the time difference threshold, the value of the analog gain compensation coefficient for the ultrasound signal may be negative. If the time difference equals to the time difference threshold, the value of the analog gain compensation coefficient for the ultrasound signal may be 1.

In some embodiments, the time difference may be compared with a plurality of threshold ranges. In some embodiments, the plurality of threshold ranges may be determined by segmenting an initial threshold range evenly or unevenly. Each of the plurality of threshold ranges may be a range corresponding to a specific analog gain compensation coefficient. In some embodiments, different threshold ranges may correspond to different analog gain compensation coefficients. The time difference may be compared with the plurality of threshold ranges. The processing device 120 may identify, from the plurality of threshold ranges, a specific threshold range matches the time difference (e.g., the time difference is within the specific threshold range), the specific threshold range may be determined as a target threshold range. An analog gain compensation coefficient corresponding to the target threshold range may be determined as the analog gain compensation coefficient for the ultrasound signal.

The second gain compensation coefficient may be a digital gain compensation coefficient. The digital gain compensation coefficient refers to a coefficient for compensating attenuation of a digital signal. In some embodiments, the digital gain compensation coefficient for the ultrasound signal may be determined based on a depth of the subject.

Ultrasound waves transmitted to the subject in a transmission may be reflected back by the subject. Ultrasound signals corresponding to different depths may be obtained. A strength (e.g., an amplitude) of each of the ultrasound signals may relate to a transmission attenuation of ultrasound waves in a transmission corresponding to the ultrasound signal, a noise level, and a corresponding depth of the subject. An attenuation degree for an ultrasound signal may be determined based on the transmission attenuation, the noise level, and the depth of the subject. In this way, the digital gain compensation coefficient for the ultrasound signal may be determined based on the attenuation degree for the ultrasound signal.

Merely for illustration, assuming that the transmission attenuation of ultrasound waves is substantially uniform during the transmission, the signal strength of the ultrasound signal may be exponentially correlated with a propagation time of ultrasound waves. In ideal conditions (e.g., without noise), a relationship between the signal strength of the ultrasound signal and the propagation time of ultrasound waves may be expressed as Equation (26):

$$S(h)=S(0)e^{\alpha}, \qquad (26)$$

where S(h) may represent the signal strength at a depth h, S(0) may represent the signal strength represent at a depth 0 (i.e., S(0) may represent an initial signal strength), α may represent the transmission attenuation of ultrasound waves, h may represent the depth of the subject, which is proportional to the propagation time of ultrasound waves.

In actual situations (e.g., with noise), a relationship between the signal strength of the ultrasound signal and the propagation time of ultrasound waves may be expressed as Equation (27):

$$S(h)=S(0)\sqrt{e^{\alpha h}+\varepsilon^2}, \qquad (27)$$

where ε denotes a noise signal.

The digital gain compensation coefficient may be determined based on Equations (26) and (27). Merely by way of example, the digital gain compensation coefficient may be provided in Equation (28):

$$\Gamma(h) = \frac{1}{\sqrt{e^{\alpha h}+\varepsilon^2}}, \qquad (28)$$

where Γ (h) denotes the digital gain compensation coefficient.

The transmission attenuation a and/or the noise signal ε may set in advance, e.g., by a user, according to default settings of the imaging system 100, etc. In some embodiments, the transmission attenuation a may be a constant. The noise signal ε may also be a constant. The digital gain compensation coefficient may only relate to the depth of the subject. In this case, the depth of the subject may be indicated by the signal strength of the ultrasound signal. Digital gain compensation coefficients corresponding to the ultrasound signals at different depths may be determined according to Equation (28).

In 2320, the processing device 120 (e.g., the beamforming module 430 or the processor 210) may perform an attenuation compensation on the ultrasound signal based on the one or more gain compensation coefficients.

After the analog gain compensation coefficient and the digital gain compensation coefficient for each ultrasound signal are determined, the ultrasound signals may be compensated based on the analog gain compensation coefficient and/or the digital gain compensation coefficient for each of the ultrasound signals.

In some embodiments, the processing device 120 may perform a primary signal compensation on each of the ultrasound signals based on the analog gain compensation coefficient. The primary signal compensation may be an attenuation compensation performed on the analog ultrasound signal.

In some embodiments, the processing device 120 may perform a secondary signal compensation on each of the ultrasound signals based on the digital gain compensation coefficient. The secondary signal compensation may be an attenuation compensation performed on a digital signal corresponding to the ultrasound signal (e.g., digitized ultrasound signal) after the primary signal compensation is performed on the ultrasound signal.

During the attenuation compensation process, each ultrasound signal may be compensated based on a corresponding analog gain compensation coefficient. For example, a mathematical operation may be performed on each ultrasound signal and an analog gain compensation coefficient corresponding to the ultrasound signal. The mathematical operation may include, for example, a product operation, an exponent operation, a power operation, etc.

After the primary signal compensation is performed, each ultrasound signal may still an analog signal. A strength of the primary signal compensation may be limited such that the noise may not be overly magnified, thus avoiding a degradation of the quality of the ultrasound image of the subject. The secondary signal compensation may be performed after the primary signal compensation is fulfilled.

An analog-to-digital (AD) conversion may be performed on each ultrasound signal before the secondary signal compensation is performed so as to obtain a digital signal corresponding to each ultrasound signal. The analog-to-digital (AD) conversion may be implemented by an AD converter. The secondary signal compensation may be performed on the digital signal corresponding to each ultrasound signal based on the digital gain compensation coefficient. For example, another mathematical operation may be performed on the digital signal corresponding to each ultrasound signal and a digital gain compensation coefficient corresponding to the ultrasound signal. The another mathematical operation may include, for example, a product operation, an exponent operation, a power operation, etc.

In some embodiments, the ultrasound signal may further be compensated in the digital domain (e.g., by performing a tertiary compensation, or the like) to obtain a more accurate ultrasound signal with less noise. In this way, the quality of the ultrasound image may be improved.

Figure 24A:
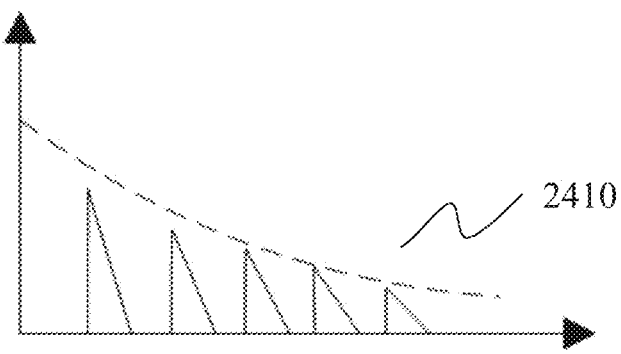
FIG. 24A is schematic diagrams illustrating an attenuation curve of an ultrasound signal according to some embodiments of the present disclosure.
Figure 24B:
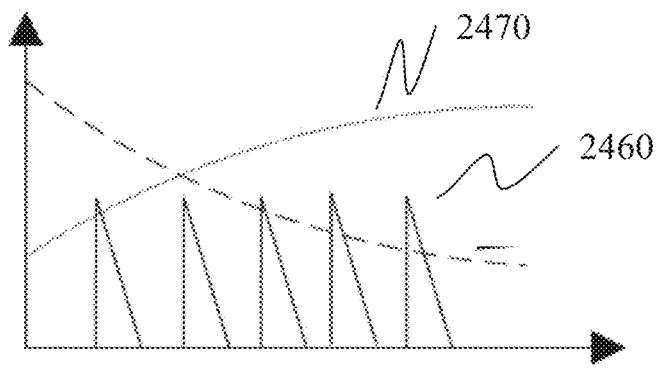
FIG. 24B is schematic diagrams illustrating a compensated ultrasound signal according to some embodiments of the present disclosure.

FIG. 24A is schematic diagrams illustrating an attenuation curve of an ultrasound signal according to some embodiments of the present disclosure. As shown in FIG. 24A, an amplitude of the ultrasound signal 2410 may decrease as the depth of the subject increases. Thus, the quality of the ultrasound image of the subject may reduce as the depth of the subject increases. In order to improve the quality of the ultrasound image, the primary signal compensation and the secondary signal compensation may need to be performed on the ultrasound signals corresponding to the one or more transmissions. FIG. 24B is schematic diagrams illustrating a compensated ultrasound signal according to some embodiments of the present disclosure. The ultrasound signal 2460 may be compensated based on a gain compensation curve 2470 associated with the depth of the subject or a propagating time of the ultrasound signal. As shown in FIG. 24B, the amplitude of the ultrasound signal may be uniform at different depths after the signal compensation is performed. The quality of ultrasound image of the subject may be improved.

According to the embodiments set forth above, the analog gain compensation coefficient for each ultrasound signal may be determined based on a detection time of the ultrasound signal and a transmitting time of a transmission corresponding to the ultrasound signal. The gain compensation coefficient used to compensate the attenuation of the ultrasound signal may be simple and effective, thereby improving the efficiency of the imaging process of the subject. The primary signal compensation and the secondary signal compensation may improve a uniformity of the ultrasound signal in both the near field and the far-field, thus providing a more accurate compensation for the ultrasound signals corresponding to the one or more transmissions, and improving the quality of ultrasound image of the subject.

FIG. 25 is a flowchart illustrating an exemplary process for determining an analog gain compensation coefficient corresponding to an ultrasound signal according to some embodiments of the present disclosure. In some embodiments, the process 2500 may be executed by the imaging system 100. For example, the process 2500 may be implemented as a set of instructions (e.g., an application) stored in a storage device (e.g., the storage device 130). The modules described in FIG. 4 and/or the processor 210 may execute the set of instructions and may accordingly be directed to perform the process 2500. The operations of the illustrated process presented below are intended to be illustrative. In some embodiments, the process 2500 may be accomplished with one or more additional operations not described and/or without one or more of the operations discussed. Additionally, the order of the operations of process 2500 illustrated in FIG. 25 and described below is not intended to be limiting. In some embodiments, the operation 2320 of the process 2300 in FIG. 23 may be performed according to the process 2500.

In 2510, the processing device 120 (e.g., the beamforming module 430 or the processor 210) may identify, from at least one threshold range, a target threshold range that matches a time difference between a detection time of the ultrasound signal and a transmitting time of the ultrasound signal.

In 2520, the processing device 120 (e.g., the beamforming module 430 or the processor 210) may determine an analog gain compensation coefficient corresponding to the ultrasound signal based on the target threshold range.

In some embodiments, after the time difference between the detection time of the ultrasound signal and the transmitting time of the ultrasound signal is determined, the time difference of the ultrasound signal may be compared with the at least one threshold range. In some embodiments, the at least one threshold range may be determined by segmenting a preset threshold range evenly or unevenly. The preset threshold range may be set by a user, according to default settings of the imaging system, etc. The time difference may be compared with the at least one threshold range. The processing device 120 may identify, from the at least one threshold range, a specific threshold range that matches the time difference (e.g., the time difference is within the specific threshold range), the specific threshold range may be determined as a target threshold range.

In some embodiments, each of the plurality of threshold ranges may be a range corresponding to a specific analog gain compensation coefficient. After the target threshold range for the ultrasound signal is obtained, the analog gain compensation coefficient corresponding to the target threshold range may be determined as the analog gain compensation coefficient for the ultrasound signal.

An AFE5832 chip may be taken as an example. The AFE5832 chip may include a time compensation module for compensating attenuations of ultrasound signals. Analog gain compensation coefficients for the ultrasound signals may be adjusted through a plurality of gears, for example, [0,288] including 289 gears. An interval between a pair of consecutive gears may be 0.125 dB. Each gear may correspond to a specific threshold range. The specific threshold range may associate with the time difference. Merely by way of example, an analog gain compensation coefficient corresponding to the gear 2 may correspond to a range of time differences (e.g., defined as time 2).

In some embodiments, if the time difference exceeds all the threshold ranges (i.e., the time difference fails to match a threshold range), a maximum analog gain compensation coefficient may be obtained, and determined as the analog gain compensation coefficient for the ultrasound signal. For example, if the time difference exceeds all the threshold ranges, a maximum analog gain compensation coefficient of the AFE5832 chip (e.g., an analog gain compensation coefficient corresponding to the gear 288) may be obtained and determined as the analog gain compensation coefficient for the ultrasound signal.

The plurality of threshold ranges may refine the matching process of the time difference, thus the target threshold range and the analog gain compensation coefficient of the ultrasound signal may be more accurate. The primary signal compensation of the ultrasound signal may be more accurate.

It should be noted that the threshold ranges are merely provided for illustration purposes, and not intended to be limiting. In some other embodiments, a time difference threshold may be provided. The time difference threshold may be set by a user, according to default settings of the imaging system 100, etc. If the time difference exceeds the time difference threshold, the analog gain compensation coefficient for the ultrasound signal may be positive. If the time difference is below the time difference threshold, the analog gain compensation coefficient for the ultrasound signal may be negative. If the time difference equals to the time difference threshold, the analog gain compensation coefficient for the ultrasound signal may be 1.

Merely by way of example, a suitable gear may be selected from the plurality of gears of the AFE5832 chip for adjusting the analog gain compensation coefficient. An analog gain compensation coefficient and a time difference threshold corresponding to the selected gear may be determined. If the time difference exceeds the time difference threshold, it may indicate that the depth of the subject is relatively large, the attenuate of the ultrasound signal may be relatively large, and the ultrasound image of the subject may be of poor quality. In this case, a positive gain compensation coefficient may be set to increase the intensity of the ultrasound signal, thus increasing the intensity of the ultrasound signal. The quality of the ultrasound image of the subject may also be improved. If the time difference is below the time difference threshold, it may indicate that the depth of the subject is relatively small, the intensity of the ultrasound signal may be excessively strong, and the ultrasound image of the subject may be ununiform. In this case, a negative gain compensation coefficient may be provided to reduce the intensity of the ultrasound signal, thus improving the quality of the ultrasound image of the subject. If the time difference is equal to the time difference threshold, it may indicate that the signal strength of the ultrasound signal at this time may be appropriate. The gain compensation coefficient for the ultrasound signal may remain unchanged. For example, the gain compensation coefficient for the ultrasound signal may be set to 1. The use of the time difference threshold may simplify the primary signal compensation, thereby improving the efficiency of the imaging process of the subject.

According to the embodiments set forth above, the analog gain compensation coefficients for ultrasound signals corresponding to the one or more transmissions may be determined. An analog gain compensation coefficient for each ultrasound signal may be determined based on at least one threshold range and a time difference between a detection time of the ultrasound signal and a transmitting time of the ultrasound signal. In this way, the primary signal compensation may be simplified, thereby improving the efficiency of the imaging process of the subject.

In some embodiments, the analog gain compensation coefficients for the ultrasound signals may be stored in a ring memory according to a data storage rule. As for each ultrasound signal, the data storage rule may include storing, in successive storage units of the ring memory sequentially, a transmission instruction corresponding to the ultrasound signal, a compensation instruction associated with the analog gain compensation coefficient, and an instruction regarding detecting the ultrasound signal.

In some embodiments, when the detector is in a working state, each of the detecting members of the detector may be in one of three states. The three states may include an ultrasound wave transmitting state, an ultrasound wave receiving state, and an idle state. A conversion from one state to another state may be carried out by an FPGA controller. In some embodiments, a transmission of control instructions for a variable gain amplifier (VGA) may also be carried out by the FPGA controller. In order to avoid the increase of system overhead and memory fragmentations caused by frequent memory allocation and release, which may cause the entire system to run slowly, a ring memory may be used to store control instructions for the detecting members of the detector of the scanner 110.

Figure 26:
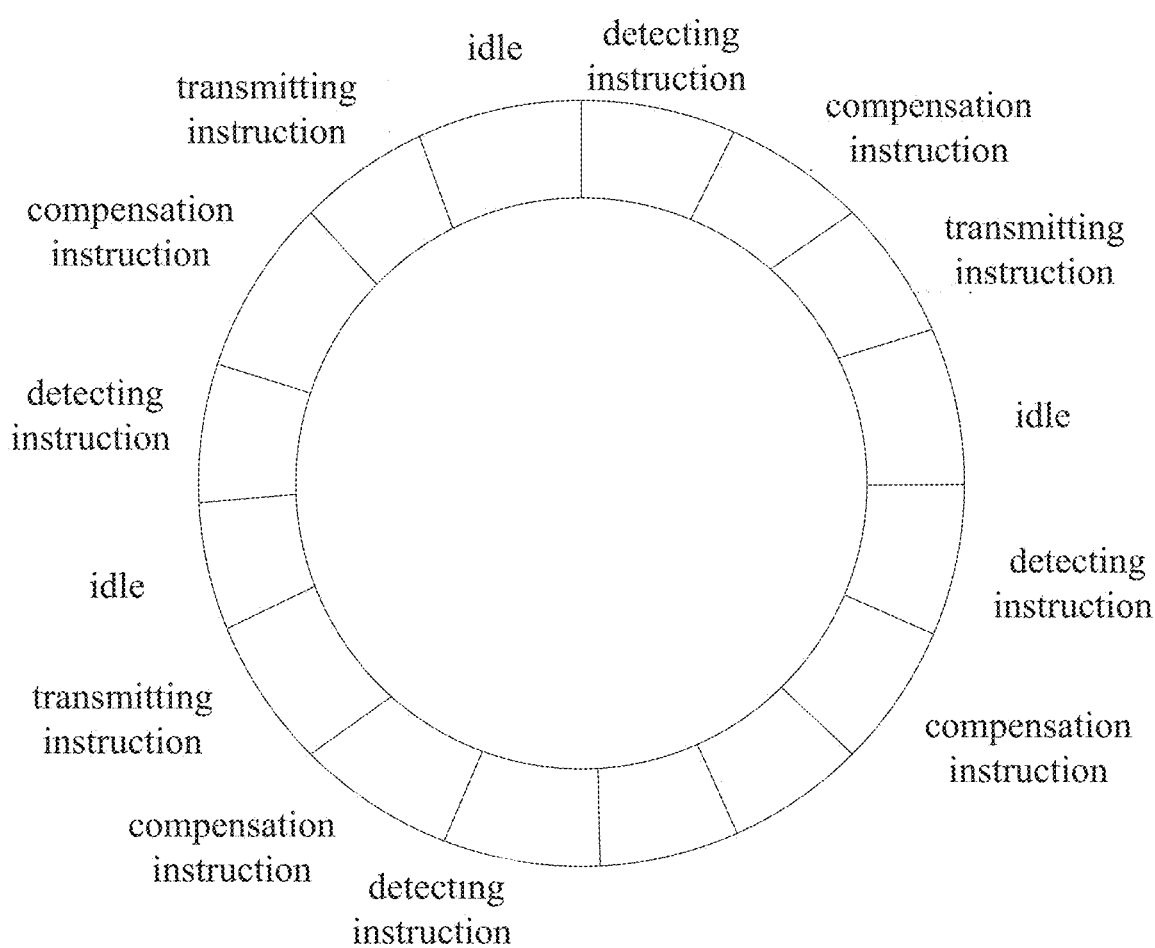
FIG. 26 is a schematic diagram illustrating an exemplary ring memory storing control instructions for detecting members of a detector according to some embodiments of the present disclosure.
Figure 27:
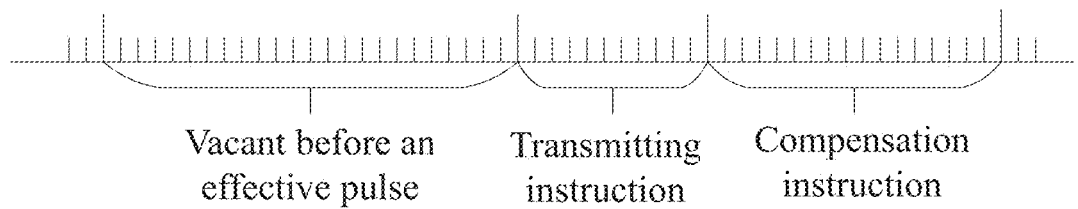
FIG. 27 illustrates an exemplary position for storing a compensation instruction associated with an ultrasound signal in the ring memory according to some embodiments.

FIG. 26 is a schematic diagram illustrating an exemplary ring memory storing control instructions for detecting members of a detector according to some embodiments of the present disclosure. As shown in FIG. 26, for each ultrasound signal corresponding to a transmission, a transmission instruction corresponding to the ultrasound signal, a compensation instruction associated with the ultrasound signal, a detecting instruction regarding detecting the ultrasound signal, and/or an instruction for entering an idle state may be stored in successive storage units of the ring memory sequentially. In some embodiments, the compensation instruction may include a threshold range for the ultrasound signal and an analog gain compensation coefficient corresponding to the threshold range. FIG. 27 illustrates an exemplary position for storing a compensation instruction associated with an ultrasound signal in the ring memory according to some embodiments. As shown in FIG. 27, the compensation instruction may be stored immediately after a transmission instruction corresponding to the ultrasound signal.

After the analog gain compensation coefficients of the ultrasound signals are stored into the ring memory, each of the ultrasound signals may be compensated by performing a primary signal compensation. In some embodiments, during a primary signal compensation for an ultrasound signal, an analog gain compensation coefficient corresponding to the ultrasound signal may be obtained from the ring memory. The analog gain compensation coefficient may be used to compensate the ultrasound signal. In some embodiments, a secondary signal compensation associated with the digital gain compensation coefficient may further be performed after the primary signal compensation for the ultrasound signal is performed.

According to the embodiments set forth above, the analog gain compensation coefficient of each ultrasound signal may be stored into the ring memory according to the preset data storage rules. An analog gain compensation coefficient corresponding to each ultrasound signal may be retrieved from the ring memory and used for a primary signal compensation performed on the ultrasound signal. Since the analog gain compensation coefficient corresponding to each ultrasound signal is stored in the ring memory, thus avoiding system congestions caused by frequently memory allocation and release and improving the efficiency of the system and the quality of the ultrasound image of the subject.

FIG. 28 is a flowchart illustrating an exemplary process for determining a size of the synthetic aperture for the transmission according to some embodiments of the present disclosure. In some embodiments, the process 2800 may be executed by the imaging system 100. For example, the process 2800 may be implemented as a set of instructions (e.g., an application) stored in a storage device (e.g., the storage device 130). The modules described in FIG. 4 and/or the processor 210 may execute the set of instructions and may accordingly be directed to perform the process 2800. The operations of the illustrated process presented below are intended to be illustrative. In some embodiments, the process 2800 may be accomplished with one or more additional operations not described and/or without one or more of the operations discussed. Additionally, the order of the operations of process 2800 illustrated in FIG. 28 and described below is not intended to be limiting.

In 2810, the processing device 120 (e.g., the obtaining module 410 or the processor 210) may determine two transmission boundaries of the transmission based on the total count of detecting members of the detector, the directivity angle of each detecting member of the detector, and a focus corresponding to the transmission.

In 2820, the processing device 120 (e.g., the obtaining module 410 or the processor 210) may determine an intersection between each of the two transmission boundaries of the transmission and a line formed by the detecting members of the detector.

In 2830, the processing device 120 (e.g., the obtaining module 410 or the processor 210) may determine a local count of detecting members of the detector on a portion of the line between the two intersections, the local count of the detecting members of the detector being determined as the size of the synthetic aperture for the transmission.

Figure 29A:
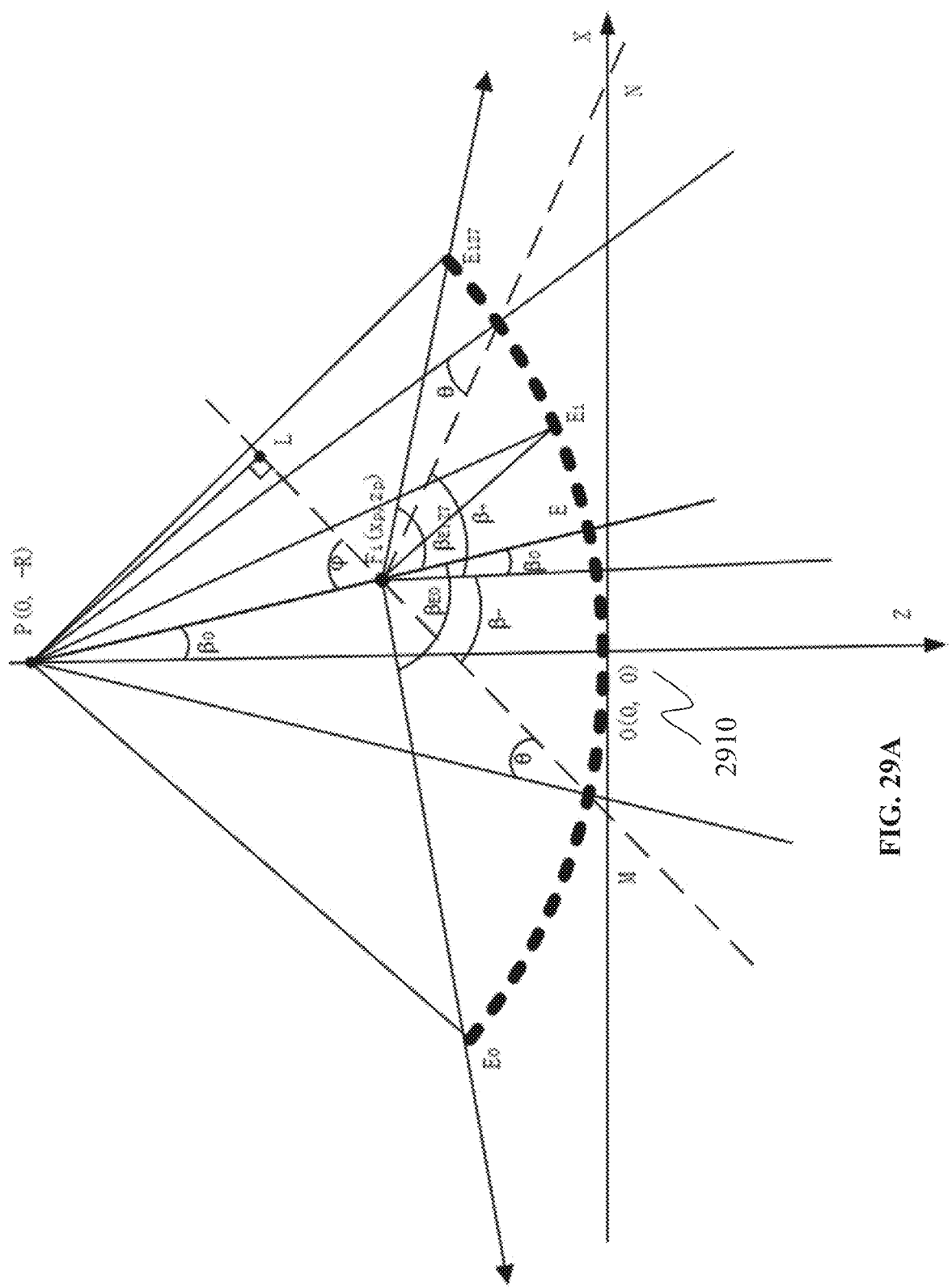
FIG. 29A illustrates a schematic diagram of detecting members of a convex array detector according to some embodiments of the present disclosure.

In some embodiments, the detector may be a convex array detector or a linear array detector. FIG. 29A illustrates a schematic diagram of detecting members of a convex array detector according to some embodiments of the present disclosure. The following descriptions regarding process 2810 through 2830 may be described in combination with the convex array detector as illustrated in FIG. 29A.

As shown in FIG. 29A, a point P may represent a center of the detector. Coordinates of the center of the detector may be determined with reference to a coordinate system 2910 defined by an X axis and a Z axis. A point O may represent an origin of a coordinate system. Coordinates of the point P may be (0, −R). A point $F_i$ may represent a virtual focus of ultrasound waves in a transmission. $E_0$ and $E_{127}$ may represent detecting members at two ends of the detector. A detecting member ε of the detector may intersect an extension line of $PF_1$, and PE may be a normal of the detecting member E. $F_iE_0$ may be a leftmost aperture boundary determined based on the detecting member $E_0$ and the virtual focus $F_iE_{127}$ may be a rightmost aperture boundary determined based on the detecting member $E_{127}$ and the virtual focus $F_i$. An angle $\hat{\theta}$ may represent a maximum directivity angle of a detecting member. Assuming that $PF_i$ is a main direction of ultrasound wave corresponding to the transmission. The ultrasound wave may originate from the virtual focus $F_i$. $PF_i$ may be a center line of the ultrasound waves. The ultrasound waves may be symmetrical to the $PF_i$. $F_iE_i$ may be a transmission direction of the ultrasound waves.

The size of the synthetic aperture for the transmission may satisfy one or more conditions. Merely for illustration, the one or more conditions may include a first condition that the size of the synthetic aperture may be smaller than the total count of detecting members of the detector (e.g., 128 detecting members as shown in FIG. 29A). The one or more conditions may also include a second condition that an angle $\angle F_iE_iP$ may be in a range $[-\hat{\theta}, \hat{\theta}]$.

Referring to FIG. 29A, a radius of the detector may be R. In some embodiments, a determination as to whether there is an invalid detecting member may be made based on the radius R of the detector, the maximum directivity angle $\hat{\theta}$, and coordinates of the virtual focus $F_i(x_p, z_p)$ in Equation (29):

$$q = x_p^2 + (z_p + R)^2 - R^2 \sin^2\hat{\theta} > 0, \qquad (29)$$

where q may represent a determination result regarding the invalid detecting member. In some embodiments, the determination as to whether there is an invalid detecting member may include determining whether the virtual focus is in a circle with a center at the point P and a radius R sin $\hat{\theta}$. As for Equation (29), since q>0, the virtual focus $F_i$ may be outside the circle. It may indicate that there are invalid detecting members.

If q<0, the virtual focus $F_i$ may be within the circle. It may indicate that there is no invalid detecting members. In addition, as many detecting members satisfying the first condition and the second condition as possible may be activated and involved in each of the one or more transmissions. In this case, for each transmission of the one or more transmissions, if q<0, all the detecting members can be activated for a transmission; if q>0, there may be invalid detecting members, and the size of the synthetic aperture corresponding to the transmission may be calculated.

The calculation of the size of the synthetic aperture corresponding to a transmission for the convex array detector may be described in connection with FIG. 29A. During the calculation process, a deflection angle of the main direction relative to the Z axis (also referred to as deflection angle of the main direction for brevity) may be determined. The deflection angle of the main direction may be an intersection angle between $PF_i$ and the Z axis may be determined according to Equation (30):

$$\beta_0 = \arctan\left(\frac{x_p}{z_p + R}\right), \quad (30)$$

where $\beta_0$ denotes the deflection angle of the main direction, $x_p$ denotes a coordinate of the virtual focus on the X axis, and $z_p$ denotes a coordinate of the virtual focus on the Z axis.

A deflection angle of the synthetic aperture may be determined. The deflection angle of the synthetic aperture may be an intersection angle between a transmission boundary of the transmission ($F_iM$ or $F_iN$) and the main direction of the ultrasound waves in the transmission (e.g., an extension line of PE). A deflection angle of the synthetic aperture may be determined according to Equation (31):

$$\phi = \arctan\frac{PL}{\sqrt{PF_i^2 - PL^2}} = \arctan\frac{R\sin\hat{\theta}}{\sqrt{x_p^2 + ((z_p + R)^2 - (R\sin\hat{\theta})^2)}}, \quad (31)$$

where $\phi$ denotes the deflection angle. If $|PF_i|=|PL|$, it may indicate that q=0. The deflection angle may be $$\frac{\pi}{2}.$$

In this case, the size of the synthetic aperture may be the count or number of all the detecting members of the detector. All the detecting members of the detector may be activated and involved in the transmission.

A determination as to whether the deflection angle is within maximum angles of the detecting members. In some embodiments, the maximum angles may include a maximum angle regarding a leftmost detecting member and a maximum angle regarding a right detecting member. The maximum angle regarding the leftmost detecting member refers to an intersection angle between the main direction of the ultrasound waves in the transmission and a line connecting the virtual focus $F_i$ and the leftmost detecting member (e.g., $E_0$). The maximum angle regarding the right detecting member refers to an intersection angle between the main direction of the ultrasound waves in the transmission and a line connecting the virtual focus $F_i$ and the right detecting member (e.g., $E_{127}$). For example, the determination may be made according to Formulae (32) and (33):

$$\phi \leq \beta_{E_0}, \quad (32)$$

$$\phi \leq \beta_{127} \quad (33)$$

where $\beta_{E_0}$ denotes the maximum angle regarding the leftmost detecting member, and $\beta_{E_{127}}$ denotes the maximum angle regarding the rightmost detecting member.

Slopes of the two transmission boundaries of the transmission may be determined. The two transmission boundaries may include a left transmission boundary and a right transmission boundary. The left transmission boundary and the right transmission boundary may be determined according to Equations (34) and (35):

$$K_l = \tan(\beta_-) = \tan(\beta_0 - \phi), \quad (34)$$

$$K_r = \tan(\beta_+) = \tan(\beta_0 + \phi), \quad (35)$$

where $K_l$ denotes the slope of the left transmission boundary $F_iM$, and $K_r$ denotes the slope of the right transmission boundary $F_iN$, $\beta_-$ denotes an intersection angle between the left transmission boundary and the Z axis, and $\beta_+$ denotes an intersection angle between the right transmission boundary and the Z axis.

Intersections between the two transmission boundaries of the transmission and a line formed by the detecting members of the convex array detector may be determined. The determined intersections may be edge detecting members of the transmission. The edge detecting members may be detecting members at edges of the synthetic aperture corresponding to the transmission. In some embodiments, the edge detecting members of the transmission may be determined by establishing simultaneous equations related to the two transmission boundaries and the circle with a center with a center point P and a radius $R \sin \hat{\theta}$ A portion of the circle may represent the line formed by the detecting members of the detector. In some embodiments, the simultaneous equations may include a linear equation of the left transmission boundary, a linear function of the right transmission boundary, and an equation of the circle with the center point P and a radius $R \sin \hat{\theta}$. For example, the edge detecting members of the transmission may be determined according to simultaneous equations (36):

$$\begin{cases} z - z_p = k_l(x - x_p) \\ z - z_p = k_r(x - x_p), \\ x^2 + (z + R)^2 = R^2 \end{cases} \quad (36)$$

where z may be a dependent variable, and x may be an independent variable.

In some embodiments, a serial number of each of the two edge detecting members of the transmission may be obtained. A count or number of detecting members between the two edge detecting members (also referred to as local count of detecting members of the detector) may be determined based on the serial number of each of the two edge detecting members. The local count of the detecting members of the detector may be determined as the size of the synthetic aperture for the transmission.

As for other transmissions, the virtual focuses corresponding to the other transmissions may be different from the virtual focus $F_i$. In this case, the intersection angle $\beta_0$ and the deflection angle $\phi$ may vary. Sizes of synthetic apertures corresponding to the other transmissions may vary accordingly.

Figure 29B:
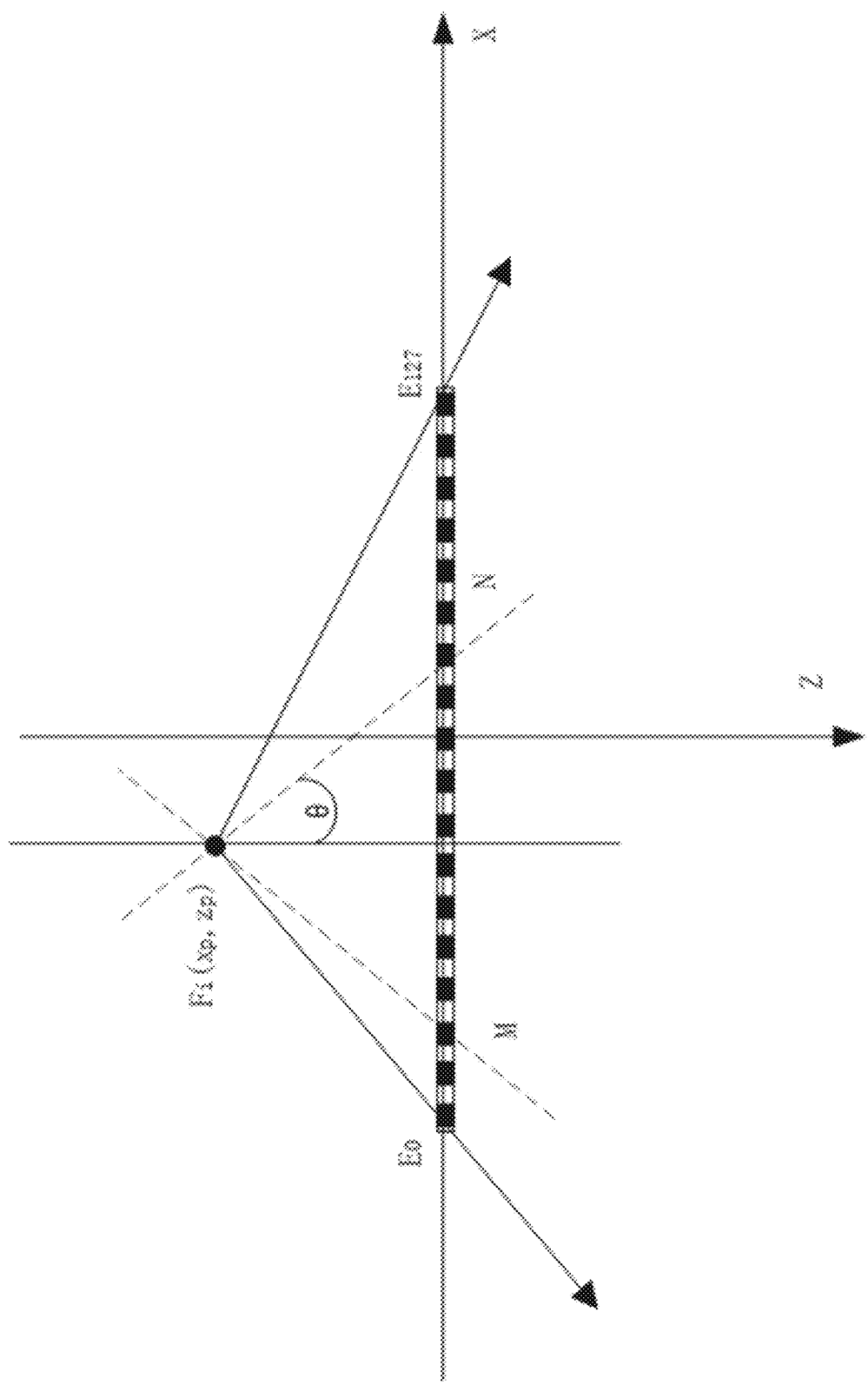
FIG. 29B illustrates a schematic diagram of detecting members of a linear array detector according to some embodiments of the present disclosure.

FIG. 29B illustrates a schematic diagram of detecting members of a linear array detector according to some embodiments of the present disclosure. Coordinates of the center of the detector may be determined with reference to a coordinate system 2960 defined by an X axis and a Z axis. A point O' may represent an origin of a coordinate system. In some embodiments, the linear array detector may be regarded as a convex array detector having an infinite radius. The radius R in Equation (29) may is infinite. In this case, the deflection angle of the main direction corresponding to the transmission (i.e., the intersection angle between $PF_i$ and the Z axis) may approach 0. The slopes of the left transmission boundary and the right transmission boundary for the linear array detector may be determined according to Equations (37) and (38):

$$K_l' = \tan(-\varphi), \quad (37)$$

$$K_r' = \tan(\varphi), \quad (38)$$

where $K_l'$ denotes the slope of the left transmission boundary for the linear array detector, and $K_r'$ denotes the slope of the left transmission boundary for the linear array detector.

Since R is infinite, the deflection angle of the synthetic aperture for the linear array detector may be determined according to Equation (39):

$$\varphi' = \arctan \frac{\sin \hat{\theta}}{\sqrt{1-\sin^2 \hat{\theta}}}, \tag{39}$$

where φ' denotes the deflection angle of the synthetic aperture for the linear array detector. The deflection angle determined according to Equation (14) may be the maximum directivity angle $\hat{\theta}$. Then intersections between the two transmission boundaries of the transmission and a line formed by the detecting members of the linear array detector may be determined. The line formed by the detecting members of the linear array detector may be the X axis. Detecting members of the synthetic aperture for the linear array detector need to be within the range between $E_0$ and $E_{127}$. If an intersection is out of the range between $E_0$ and $E_{127}$, the intersection may be replaced by the detecting member $E_0$ or $E_{127}$ such that the detecting members of the synthetic aperture for the linear array detector are within the range between $E_0$ and $E_{127}$. If both the two intersections are out of the range between $E_0$ and $E_{127}$, detecting members of the synthetic aperture may be detecting members from $E_0$ and $E_{127}$. Then the local count of the detecting members of the linear array detector may be determined. The local count of the detecting members of the linear array detector may be determined as the size of the synthetic aperture for the transmission.

As set forth above, the size of the synthetic aperture may be determined in consideration of directivities of the detecting members of the detector and characteristics of a main lobe of the ultrasound waves, the influence of grating lobes may be reduced or eliminated. The utilization rate of the detecting members may be maximized. The intensities of ultrasound waves and corresponding ultrasound signals in the one or more transmissions may be more appropriate, and the quality of the ultrasound image may be higher.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on a computing device having a processor and a computer-readable storage device, the method comprising:
    obtaining ultrasound signals of pixels of at least one region, wherein the ultrasound signals are generated based on a scanning protocol, the scanning protocol including virtual focuses of a plurality of transmissions of ultrasound waves from an ultrasound scanner and an interval between each pair of consecutive transmissions of the plurality of transmissions, the virtual focuses are far-field virtual focuses;
    generating a plurality of primary images of the at least one region corresponding to the plurality of transmissions, each of the plurality of primary images being generated by beamforming an ultrasound signal of each pixel of the at least one region corresponding to one of the plurality of transmissions; and
    generating an ultrasonic image of a subject located in the at least one region by combining or fusing the plurality of primary images corresponding to the plurality of transmissions, each primary image of the plurality of primary images corresponding to one transmission of the plurality of transmissions, and the virtual focuses of each transmission of the plurality of transmissions are far-field virtual focuses.

2. The method of claim 1, wherein the generating a plurality of primary images of the at least one region corresponding to the plurality of transmissions includes:
    for each of the plurality of transmissions,
    determining a signal sequence of each pixel of the at least one region by demodulating an ultrasonic signal of the pixel corresponding to the transmission;
    determining, based on the signal sequence of the pixel, a value of each pixel of the at least one region corresponding to the transmission; and
    generating a primary image of the at least one region corresponding to the transmission based on the value of each pixel of the at least one region.

3. The method of claim 2, wherein the determining, based on the signal sequence of the pixel, a value of each pixel of the at least one region corresponding to the transmission includes:
    determining target beamforming parameters of each pixel of the at least one region corresponding to the transmission; and
    determining the value of each pixel based on the signal sequence of the pixel and the target beamforming parameters of the pixel corresponding to the transmission.

4. The method of claim 3, wherein
    the target beamforming parameters of each pixel include at least one of a total count of detecting members of a detector of the ultrasound scanner, delay times regarding the pixel, angular weights of the pixel, or a distance weight of the pixel, and
    the determining the value of each pixel based on the signal sequence of the pixel and the target beamforming parameters of the pixel includes:
        determining the value of each pixel based on the signal sequence of the pixel and at least one of the target beamforming parameters of the pixel.

5. The method of claim 4, wherein the delay times of the pixel are determined based on coordinates of each of the detecting members, coordinates of the pixel, and coordinates of a far-field virtual focus corresponding to the transmission.

6. The method of claim 4, wherein the angular weights of the pixel are determined based on angles between normal directions of the detecting members of the detector and a target direction of ultrasound signal of the pixel.

7. The method of claim 4, wherein the distance weight of the pixel is determined based on coordinates of the pixel and coordinates of a far-field virtual focus corresponding to the transmission.

8. The method of claim 3, wherein the determining target beamforming parameters of each pixel of the at least one region corresponding to the transmission includes:
obtaining a type of a detector of the ultrasound scanner; and
identifying the target beamforming parameters of each pixel of the at least one region from a mapping table according to the type of the detector, wherein the mapping table includes correspondence relationships between beamforming parameters of pixels of the at least one region and a plurality of types of the detector.

9. The method of claim 2, further including:
performing an interpolation on the signal sequence of each pixel of the at least one region based on an interpolation approach and delay times of the pixel, wherein the value of each pixel of the at least one region is determined based on the interpolated signal sequence of the pixel.

10. The method of claim 1, wherein
the plurality of transmissions of ultrasound waves of the ultrasound scanner are from one or more detecting members of a convex array detector of the ultrasound scanner, and
the generating an ultrasonic image of a subject in the at least one region based on the plurality of primary images corresponding to the plurality of transmissions includes:
generating a secondary image of the subject in the at least one region by combining the plurality of primary images corresponding to the plurality of transmissions;
determining coordinates of pixels in the secondary image with respect to a first coordinate system, wherein an origin of the first coordinate system is located at a mid-point of a tangent line segment of at least one central detecting member of the detecting members of the detector; and
generating the ultrasonic image of the subject in the at least one region by performing a coordinate conversion on the pixels in the secondary image according to a relationship between the first coordinate system and a second coordinate system, wherein an origin of the second coordinate system is located at a center point of the convex array detector.

11. A system, comprising:
at least one storage medium including a set of instructions; and
at least one processor configured to communicate with the at least one storage medium, wherein when executing the set of instructions, the at least one processor is configured to direct the system to perform operations including:
obtaining ultrasound signals of pixels of at least one region, wherein the ultrasound signals are generated based on a scanning protocol, the scanning protocol including virtual focuses of a plurality of transmissions of ultrasound waves from an ultrasound scanner and an interval between each pair of consecutive transmissions of the plurality of transmissions, the virtual focuses are far-field virtual focuses;
generating a plurality of primary images of the at least one region corresponding to the plurality of transmissions, each of the plurality of primary images being generated by beamforming an ultrasound signal of each pixel of the at least one region corresponding to one of the plurality of transmissions; and
generating an ultrasonic image of a subject located in the at least one region by combining or fusing the plurality of primary images corresponding to the plurality of transmissions, each primary image of the plurality of primary images corresponding to one transmission of the plurality of transmissions, and the virtual focuses of each transmission of the plurality of transmissions are far-field virtual focuses.

12. The method of claim 1, wherein one of the far-field virtual focuses refers to a virtual focus outside an imaging region of a detector of the ultrasound scanner.

13. The method of claim 2, wherein the value of each pixel of the at least one region corresponding to the transmission is determined based on the signal sequence of the pixel, at least one of target beamforming parameters of the pixel, or one or more beamforming functions.

14. The method of claim 1, wherein the beamforming an ultrasound signal of each pixel of the at least one region corresponding to one of the plurality of transmissions includes:
for each of the plurality of transmissions,
performing a beamforming operation on the ultrasound signal of the each pixel of the at least one region corresponding to the transmission, the beamforming operation is associated with the at least one region instead of scanning lines; and
generating a primary image corresponding to the transmission based on a beamforming result of each pixel of the at least one region.

15. The method of claim 1, wherein the beamforming an ultrasound signal of each pixel of the at least one region corresponding to one of the plurality of transmissions includes:
for each of the plurality of transmissions,
identifying one or more target beamforming parameters of the each pixel of the at least one region corresponding to the transmission from a pre-established mapping table according to a type of a detector of the ultrasound scanner;
determining a value of each pixel based on a signal sequence of each pixel of the at least one region and the one or more target beamforming parameters of the pixel of the at least one region; and
generating the primary image of the at least one region corresponding to the transmission based on values of the pixels of the at least one region.

16. The method of claim 2, further comprising:
performing an interpolation on the signal sequence of each pixel of the at least one region based on a modified interpolation approach and delay times of the pixel, wherein the modified interpolation approach includes a modification on the interpolation, the modification relates to at least one parameter of an amplitude, a phase, or a frequency of the ultrasound signal of the pixel.

17. The method of claim 1, wherein a size of a synthetic aperture for each of the plurality of transmissions corresponding to the far-field virtual focuses is different among different transmissions.

18. The method of claim 1, wherein the obtaining ultrasound signals of pixels of at least one region includes:
dynamically determining a synthetic aperture for each of one or more transmissions corresponding to the far-field virtual focuses based on a total count of detecting members of a detector of the ultrasound scanner and a directivity angle of each detecting member of the detector;

scanning the subject in the one or more transmissions of ultrasound waves through corresponding synthetic apertures; and generating the ultrasound signals corresponding to the one or more transmissions.

19. The method of claim 18, further comprising:

dynamically determining a size of the synthetic aperture for each of the one or more transmissions based on a first condition and a second condition, wherein the first condition includes a size of the synthetic aperture is smaller than the total count of detecting members of the detector, the second condition includes an angle defined by a centerline of the detector and radiuses of the detector passing through two intersections is smaller than a maximum directivity angle of the detecting members of the detector;

wherein the two intersections are determined based on a line formed by each of two transmission boundaries of the each transmission and the detecting members of the detector, the two transmission boundaries of the each transmission are boundaries of ultrasound waves propagated from a virtual focus corresponding to the each transmission.

20. The method of claim 19, further comprising:

determining the two transmission boundaries of each transmission based on the total count of detecting members of the detector, the directivity angle of each detecting member of the detector, and a focus corresponding to each transmission;

determining an intersection between each of the two transmission boundaries of each transmission and a line formed by the detecting members of the detector; and determining a local count of detecting members of the detector on a portion of a line between the two intersections, and designating the local count of the detecting members of the detector as the size of the synthetic aperture for each transmission.

* * * * *